(12) United States Patent
Yao et al.

(10) Patent No.: US 11,334,632 B2
(45) Date of Patent: May 17, 2022

(54) DATA STORAGE AND CALLING METHODS AND DEVICES

(71) Applicant: Advanced New Technologies Co., Ltd., Grand Cayman (KY)

(72) Inventors: Kaisheng Yao, Zhejiang (CN); Peng Xu, San Mateo, CA (US); Yuan Qi, Zhejiang (CN); Xiaofu Chang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/774,629

(22) Filed: Jan. 28, 2020

(65) Prior Publication Data
US 2020/0167388 A1    May 28, 2020

Related U.S. Application Data

(63) Continuation of application No. 16/438,917, filed on Jun. 12, 2019, which is a continuation of application No. PCT/CN2018/090276, filed on Jun. 7, 2018.

(30) Foreign Application Priority Data

Jun. 13, 2017   (CN) .......................... 201710443328.4

(51) Int. Cl.
*G06F 16/909* (2019.01)
*G06F 16/955* (2019.01)
(Continued)

(52) U.S. Cl.
CPC ............ *G06F 16/909* (2019.01); *G06F 9/451* (2018.02); *G06F 16/29* (2019.01); *G06F 16/955* (2019.01);
(Continued)

(58) Field of Classification Search
CPC ........ G06F 16/909; G06F 9/451; G06F 16/29; G06F 16/9537; G06F 16/955;
(Continued)

(56) References Cited

U.S. PATENT DOCUMENTS 8,819,027 B1    8/2014   Sivasubramanian et al.
9,507,818 B1    11/2016  Stefani et al.
(Continued)

FOREIGN PATENT DOCUMENTS

CN    101625699 A    1/2010
CN    102812757 A    12/2012
(Continued)

OTHER PUBLICATIONS

Extended European Search Report for European Application No. 18818895.7 from the European Patent Office, dated Feb. 13, 2020.
(Continued)

*Primary Examiner* — Mark D Featherstone
*Assistant Examiner* — Samuel C Sharpless, III
(74) *Attorney, Agent, or Firm* — Finnegan, Henderson, Farabow, Garrett & Dunner, LLP

(57) ABSTRACT

Data storage and calling methods and devices are provided. One of the methods includes: receiving first motion data and business data; establishing an association relationship between the first motion data and the business data and storing the association relationship; receiving second motion data; and determining first motion data that matches the second motion data, and returning, to a sender of the second motion data, business data associated with the matched first motion data.

9 Claims, 27 Drawing Sheets

(51) Int. Cl.
  *G06F 16/29* (2019.01)
  *G06K 9/62* (2022.01)
  *H04W 4/02* (2018.01)
  *H04L 67/52* (2022.01)
  *G06F 9/451* (2018.01)
  *G06F 16/9537* (2019.01)
  *G06F 16/957* (2019.01)
  *H04L 67/51* (2022.01)

(52) U.S. Cl.
  CPC ........ *G06F 16/957* (2019.01); *G06F 16/9537* (2019.01); *G06K 9/6215* (2013.01); *H04L 67/16* (2013.01); *H04L 67/18* (2013.01); *H04W 4/027* (2013.01)

(58) Field of Classification Search
  CPC . G06F 16/957; G06F 16/9554; G06K 9/6215; H04L 67/16; H04L 67/18; H04W 4/027; G06Q 30/02; G06Q 30/0207; G06Q 30/0259; G06Q 30/0261
  See application file for complete search history.

(56) References Cited

U.S. PATENT DOCUMENTS

| | | | |
|---|---|---|---|
| 2007/0273558 A1* | 11/2007 | Smith | G09B 29/007 340/995.1 |
| 2015/0082256 A1 | 3/2015 | Lee et al. | |
| 2015/0120553 A1 | 4/2015 | Li | |
| 2015/0123897 A1* | 5/2015 | Takahagi | G06F 3/0346 345/156 |
| 2015/0186944 A1* | 7/2015 | Forsblom | G06F 3/017 705/14.64 |
| 2015/0348591 A1* | 12/2015 | Kaps | G11B 27/031 386/201 |
| 2016/0378845 A1 | 12/2016 | Sivasubramanian et al. | |
| 2017/0182413 A1* | 6/2017 | Takahagi | G06F 3/017 |

FOREIGN PATENT DOCUMENTS

| | | | | |
|---|---|---|---|---|
| CN | 104516774 A | | 4/2015 | |
| CN | 104679227 A | | 6/2015 | |
| CN | 105117143 A | | 12/2015 | |
| CN | 105184647 A | | 12/2015 | |
| CN | 106649574 A | * | 11/2016 | ......... G06F 16/9537 |
| CN | 106603604 A | | 4/2017 | |
| CN | 106649574 A | | 5/2017 | |
| EP | 2 849 027 A2 | | 3/2015 | |
| JP | 2013521576 A | | 6/2013 | |
| JP | 2017078915 A | | 4/2017 | |
| KR | 20150032101 A | | 3/2015 | |
| WO | WO 2015/177835 A1 | | 11/2015 | |

OTHER PUBLICATIONS

International Search Report in International Application No. PCT/CN2018/090276, dated Sep. 7, 2018.
Notice of Preliminary Rejection for Korean Application No. 10-2019-7017082, dated Aug. 31, 2020.
Office Action of Japanese Application No. 2019-530799, dated Sep. 24, 2020.
Written Opinion of the Intellectual Property Office of Singapore issued in Application No. 11201905239U, dated Jan. 8, 2021.
Examination Report in Indian Application No. 201917022757, dated Feb. 22, 2021.
Notice of Final Rejection in Korean Application No. 10-2019-7017082, dated Mar. 30, 2021.
Examination Report in European Application No. 18818895.7, dated Feb. 9, 2021.
Mager, A., Eight burning questions for Bump co-founder Jake Mintz, The Web Life, retrieved from https://www.zdnet.com/article/eight-burning-questions-for-bump-co-founder-jake-mintz/, dated Mar. 26, 2010, 4 pages.
Decision to Grant in Japanese Application No. 2019-530799, dated Apr. 19, 2021.
Decision of Patent Grant of Korean Application No. 10-2019-7017082, dated Jul. 6, 2021.

* cited by examiner

DATA STORAGE AND CALLING METHODS AND DEVICES

CROSS-REFERENCE TO RELATED APPLICATIONS

This application is a continuation application of U.S. application Ser. No. 16/438,917, filed on Jun. 12, 2019, which is a continuation application of International Application No. PCT/CN2018/090276, filed on Jun. 7, 2018, which is based upon and claims priority to Chinese Patent Application No. 201710443328.4, filed on Jun. 13, 2017, the entire content of all of which is incorporated herein by reference.

TECHNICAL FIELD

The present application relates to the field of information technologies, and in particular to data storage and calling methods and devices.

TECHNICAL BACKGROUND

As the modern society has entered an era of information explosion, a large amount of data is being generated all the time in the network. For users, how to obtain required data from massive data becomes a very important issue.

In the prior art, each resource (e.g., data) stored network has a unique corresponding uniform resource locator (URL). To obtain data, a user may obtain the URL corresponding to the data first and then determine the storage address of the data as well as how to obtain the data based on the URL.

However, in the prior art, the ways users obtain data are relatively monotonous. For example, users can usually find required data and obtain the corresponding URL through a web search engine or a website. Alternatively, the URL corresponding to the data is obtained by scanning an identification code including the URL. Alternatively, the corresponding data is obtained by receiving a URL sent by another person.

It can be seen that the existing methods for obtaining data are relatively monotonous, and there are certain limitations or inconveniences in operation. As a result, users feel inefficient in obtaining data and have low use desire. Therefore, diversified data obtaining methods are needed to simplify the data obtaining process, enhance the use desire of users, and improve the efficiency in obtaining data.

SUMMARY

Embodiments of the specification provide data storage and calling methods, which adopt diversified data obtaining methods to simplify the data obtaining process and enhance the use desire of users. The methods can solve the problem of low efficiency in obtaining data and low use desire of users in the prior art, in which the methods for obtaining data are relatively monotonous and there are certain limitations or inconveniences in operation.

According to one aspect, a data calling method includes: receiving first motion data and business data; establishing an association relationship between the first motion data and the business data and storing the association relationship; receiving second motion data; and determining first motion data that matches the second motion data, and returning, to a sender of the second motion data, business data associated with the matched first motion data.

According to another aspect, a data storage method includes: receiving first motion data and business data sent by a first user; and establishing an association relationship between the first motion data and the business data and storing the association relationship.

According to still another aspect, a data storage method includes: collecting, by a first terminal, first motion data of a first user and determining business data; and sending the first motion data and the business data to a server, so that the server establishes an association relationship between the first motion data and the business data and stores the association relationship.

According to still another aspect, a data calling method includes: receiving second motion data sent by a second user; determining first motion data that matches the second motion data; and returning, to the second user, business data associated with the determined first motion data.

According to still another aspect, a data calling method includes: collecting, by a second terminal, second motion data of a second user; sending the second motion data to a server; and receiving business data returned by the server and associated with first motion data that matches the second motion data.

According to still another aspect, data storage device includes: a processor; and a memory storing instructions executable by the processor, wherein the processor is configured to receive first motion data and business data sent by a first user; and establish an association relationship between the first motion data and the business data and storing the association relationship.

According to still another aspect, a data storage device includes: a processor; and a memory storing instructions executable by the processor, wherein the processor is configured to: collect first motion data of a first user and determining business data; and send the first motion data and the business data to a server, so that the server establishes an association relationship between the first motion data and the business data and stores the association relationship.

According to still another aspect, a data calling device includes: a processor; and a memory storing instructions executable by the processor, wherein the processor is configured to: receive second motion data sent by a second user; determine first motion data that matches the second motion data; and return, to the second user, business data associated with the determined first motion data.

According to still another aspect, a data calling device includes: a processor; and a memory storing instructions executable by the processor, wherein the processor is configured to: collect second motion data of a second user; send the second motion data to a server; and receive business data returned by the server and associated with first motion data that matches the second motion data.

The above-mentioned technical solutions may achieve the following beneficial effects. First, first motion data and business data are received, and association relationships among the first motion data, the business data and the geographical location information are established and stored. Next, second motion data may be received in the case of data calling. Finally, first motion data that matches the second motion data is determined, and business data associated with the matched first motion data is returned to a sender of the second motion data. It may be seen that, by the methods, a sender of second motion data can obtain business data associated with first motion data only by sending second motion data that matches the first motion data. Therefore, more ways are available for users to obtain data, users are motivated to obtain data in a novel way, the data obtaining process is simplified, the use desire of users is enhanced, and the efficiency in obtaining data is improved.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the specification.

Figure 1:
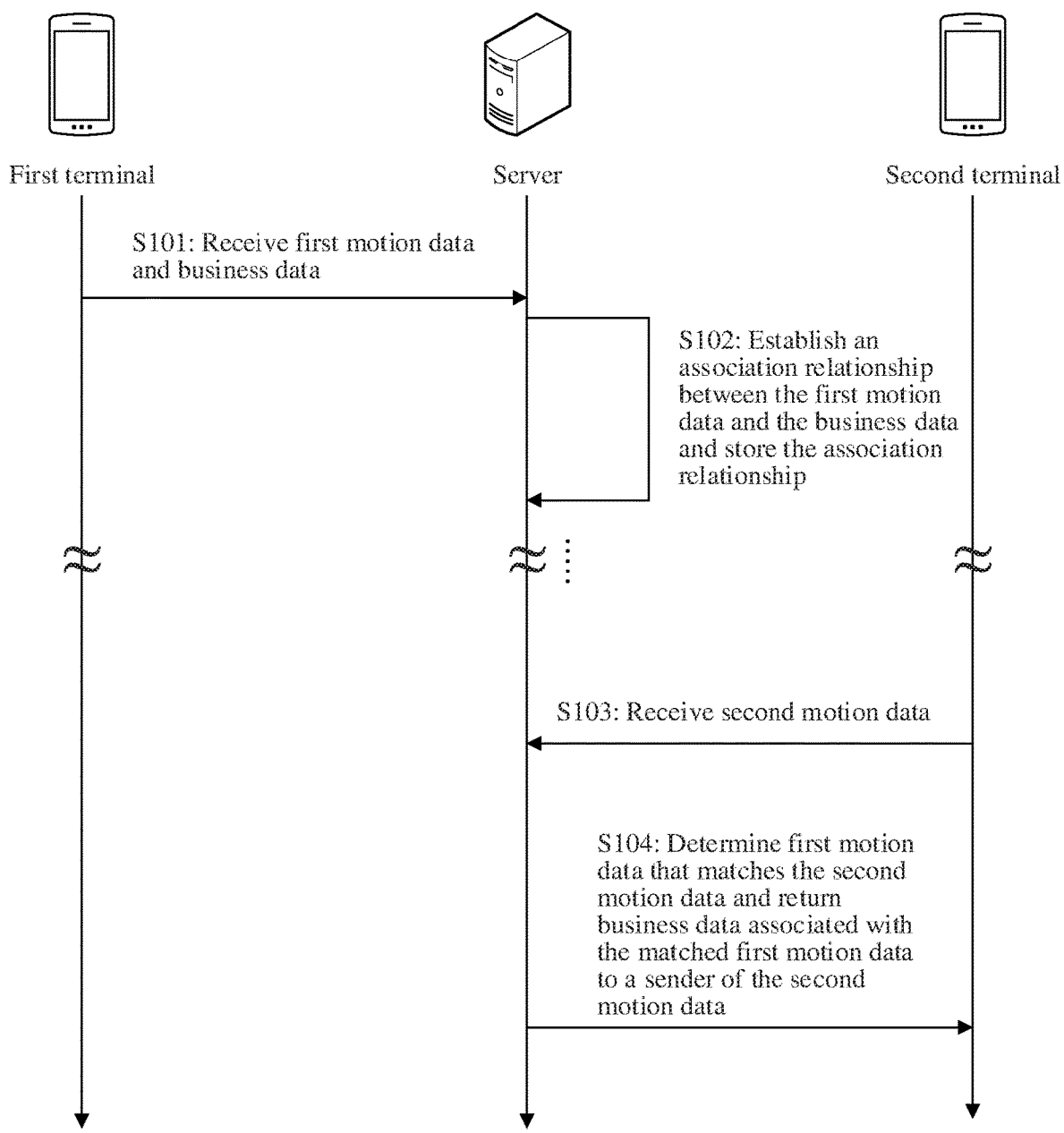
FIG. 1 shows a schematic diagram of a data processing process according to some embodiments.

FIG. 1 shows a schematic diagram of a data processing process 100 according to some embodiments. Referring to FIG. 1, the data processing process 100 includes the following steps.

In step S101: first motion data and business data are received.

In some embodiments, for convenience of description, a first user is described as a user who provides business data (such as, a seller user, an advertiser, and an event marketing company). In order to provide business data to other users (e.g., a second user), the first user may use a first terminal to send the business data and first motion data to a server for storage. The first motion data herein is motion data sent by the first user who provides the business data.

Therefore, the server may receive the business data sent by the first user, and the server may further receive the first motion data sent by the first user. The embodiments do not limit the sending sequence of the first motion data and the business data, and the first motion data and the business data may also be sent to the server together.

Moreover, the first motion data and the business data may both include the account ID of the first user, and then the server may determine, in a subsequent step, that the first motion data and the business data have an association relationship.

In step S102: an association relationship between the first motion data and the business data is established and stored.

In some embodiments, when receiving first motion data and business data, the server may determine, according to an account ID included in the first motion data and the business data, that the first motion data and the business data have an association relationship, and then the server may establish an association relationship between the first motion data and the business data and store the first motion data, the business data and the established association relationship.

In addition, the server may store different first motion data and business data sent by the first user. Therefore, when the server subsequently calls data, the data to be called is business data stored in the server and associated with any one or more pieces of first motion data.

In step S103: second motion data is received.

In some embodiments, for convenience of description, a second user is described as a user who needs to obtain business data (such as, a buyer user and a user who receives service). The second user may use a second terminal to send second motion data to the server in order to obtain the required business data. The second motion data herein is motion data sent by the second user who needs to obtain business data.

In addition, the second user may be prompted to perform a motion corresponding to the second motion data by providing text, a picture, an audio, or a video. When the second user needs to obtain the business data, the second user may perform a corresponding motion according to information displayed by the first user. Then, the second user may use the second terminal to send, to the server, the second motion data corresponding to the performed motion and obtain the business data provided by the first user.

Therefore, in some embodiments, the server may further receive the second motion data sent by the second user, so that the server subsequently determines the business data that the second user needs to obtain according to the second motion data and returns the business data.

Here, the execution process of step S103 may be independent of step S101 and step S102. That is to say, the server may receive the first motion data and the business data sent by the first user, and may also receive the second motion data sent by the second user at the same time. The time sequence between step S101 to step S102 and step S103 to step S104 is not limited here.

In step S104: first motion data that matches the second motion data is determined and business data associated with the matched first motion data is returned to a sender of the second motion data.

In some embodiments, when receiving the second motion data, the server may match the first motion data stored in step S101 and step S102 with the second motion data, and return, to the sender of the second motion data (i.e., the second user), business data associated with the first motion data that matches the second motion data.

For example, when User s sends business data to other users, the User s serves as the first user. Moreover, motion data sent by the User s and associated with the business data is the first motion data. When the User s sends motion data to obtain business data, the User s serves as the second user, and the sent motion data is the second motion data. It may be seen that one user may be both the first user and the second user in the embodiments.

Through the above steps, the second user only needs to send the second motion data that matches the first motion data, and then the second user may obtain the business data sent by the first user. Therefore, more ways are available for users to obtain data, users are motivated to obtain data in a novel way, the data obtaining process is simplified, the use desire of users is enhanced, and the efficiency in obtaining data is improved Embodiments of the specification provide a data storage process, as shown in FIG. 2, based on the data calling process shown in FIG. 1.

Figure 2:
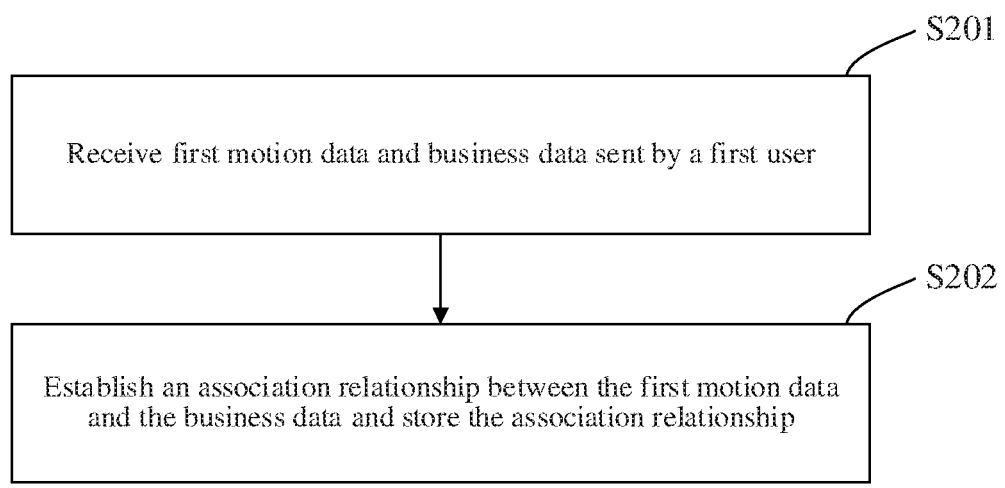
FIG. 2 shows a flow chart of a data processing process according to some embodiments.

FIG. 2 shows a flow chart of a data storage process 200 according to some embodiments. Referring to FIG. 2, the data storage process 200 includes the following steps.

In step S201: first motion data and business data sent by a first user are received.

The data storage process is intended to avoid the problem of low efficiency in obtaining data and low use desire of users in the prior art due to the fact that the methods for obtaining data are relatively monotonous and there are certain limitations or inconveniences in operation. In some embodiments, a server may receive business data and first motion data and create an association relationship between the business data and the first motion data, so that other users only need to send a motion that matches the first motion data to obtain business data associated with the first motion data. For this reason, the server storing the business data needs to establish and store the above association relationship. Thus, the first motion data and the business data sent by the first user may be received by the server.

The server herein may be a single device or a system composed of multiple devices. The first user may send the first motion data and the business data through a first terminal, where the first terminal may be a mobile phone, a tablet computer, a personal computer, a smart wearable device, etc., and it will not be limited here.

For example, the server may receive the first motion data and the business data sent by the first user. Moreover, the first user may send the first motion data and the business data to the server through an account that is logged in on the first terminal, so the first motion data and/or the business data may also carry the account ID of the account. Then, in a subsequent data calling process, the server may determine the correspondence between called business data and the account ID. It should be noted that, in some embodiments, the data calling process and the data processing process are independent of each other.

In addition, the business data and the first motion data may be sent to the server at one time after being packaged by the first terminal or may be sent to the server in multiple times. Then, through the account ID included in the first motion data and the business data, the server may determine that there is an association relationship between the received business data and the first motion data.

The first motion data herein is the first motion data of the first user collected by the first terminal, and includes: e.g., acceleration data and angular velocity data recorded in a chronological order, as shown in Table 1.

TABLE 1

| Time | Acceleration data | Angular velocity data |
| --- | --- | --- |
| 0.0 s-1.1 s | 0 | 0 |
| 1.2 s-1.5 s | X axis $9.8^m/s^2$ | X axis $0.600^{rad}/s$ |
| | Y axis $2^m/s^2$ | Y axis $-0.003^{rad}/s$ |
| | Z axis $0^m/s^2$ | Z axis $0.000^{rad}/s$ |
| 1.6 s-2.0 s | 0 | 0 |
| 2.1 s-2.5 s | X axis $0.5^m/s^2$ | X axis $1.000^{rad}/s$ |
| | Y axis $0^m/s^2$ | Y axis $0.000^{rad}/s$ |
| | Z axis $0^m/s^2$ | Z axis $0.000^{rad}/s$ |
| 2.6 s-3.0 s | X axis $0.5^m/s^2$ | X axis $0.006^{rad}/s$ |
| | Y axis $0.6^m/s^2$ | Y axis $0.800^{rad}/s$ |
| | Z axis $0^m/s^2$ | Z axis $0.007^{rad}/s$ |

Through the acceleration data and the angular velocity data recorded in chronological order in Table 1, the motion trajectory of the first terminal may be determined, and the motion made by the first user may be roughly determined by the motion trajectory of the first terminal.

In addition, in some embodiments, the server may further receive motion description information sent by the first user, and determine, from pre-stored pieces of motion data, motion data corresponding to the motion description information as the received first motion data. The motion description information herein may be text information, such as "draw a circle," "write an Arabic number 5," etc. In some embodiments, the server may determine a corresponding piece of first motion data by using the text information in the same manner as the prior art.

For example, when receiving motion description information sent by a first user, the server may first determine pre-stored motion description information that matches the motion description information sent by the first user according to correspondence between pre-stored motion description information or keywords and every piece of motion data, and then determine corresponding first motion data. Alternatively, the corresponding first motion data is determined according to a keyword in the received motion description information. The keyword herein may be set as needed, and how to select a keyword is not limited here.

For example, it is assumed that every piece of motion data (and each keyword) and its corresponding motion description information, pre-stored in a server B, are as shown in Table 2.

TABLE 2

| pre-stored motion description information | pre-stored keyword | pre-stored motion data |
| --- | --- | --- |
| Arabic number 0 | 0 | Motion data 1 |
| Arabic number 1 | 1 | Motion data 2 |
| ... | ... | ... |

TABLE 2-continued

| pre-stored motion description information | pre-stored keyword | pre-stored motion data |
|---|---|---|
| Arabic number 9 | 9 | Motion data 10 |
| Draw a horizontal line | Horizontal line | Motion data 11 |
| Draw a slash | Slash | Motion data 12 |
| ... | ... | ... |
| Draw a circle | Circle | Motion data n − 1 |
| English letter a | a | Motion data n |
| English letter A | A | Motion data n + 1 |
| English letter b | b | Motion data n + 2 |
| ... | ... | ... |
| English letter Z | Z | Motion data n + 51 |
| ... | ... | ... |

When receiving motion description information sent by a first user, the server B may determine corresponding pre-stored motion data, according to pre-stored motion description information or keywords shown in Table 2, as first motion data sent by the first user. It is assumed that the motion description information sent by the first user is "write an English letter a first, then draw a circle." Then, the server B may determine motion data n according to motion description information "English letter a" and determine motion data n−1 according to a keyword "circle." Then, the server may determine that the first motion data sent by the first user is: motion data n+motion data n−1.

Further, different users may have different understandings about the same motion description information, so the first motion data determined by the server may be different from the intention of the motion description information sent by the first user. Similarly, the server may determine first motion data composed of multiple pieces of pre-stored motion data according to the motion description information sent by the first user; however, the first user's intention may be just one of the multiple pieces of motion data.

Figure 3A:
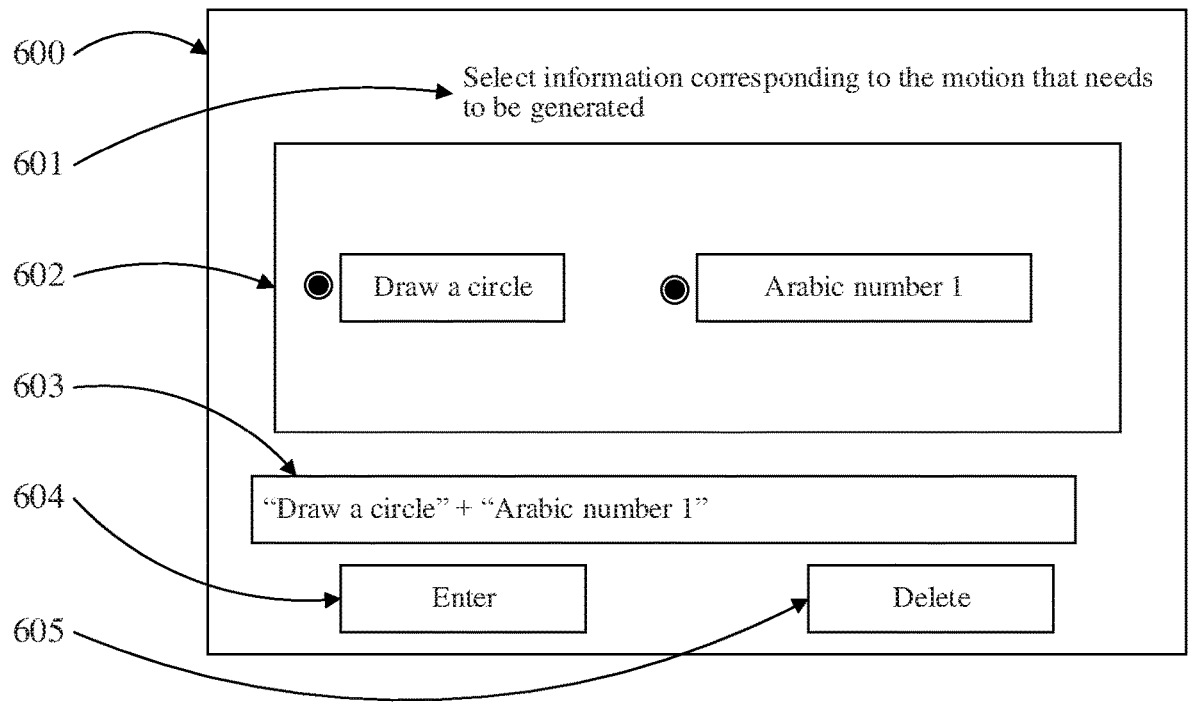
FIGS. 3a-3c are schematic diagrams of interfaces of query information according to some embodiments.

Therefore, the server may return, to the first user, every piece of motion description information corresponding to the determined motion data as an option in the form of query information, as shown in FIG. 3a.

FIG. 3a is a schematic diagram of an interface of query information according to some embodiments. Here, it can be seen that an option interface 600 includes: prompt information "Select information corresponding to the motion that needs to be generated" 601, motion description information 602 corresponding to each piece of pre-stored motion data determined by the server, a display area 603 for selected motion description information, an "Enter" key 604 and a "Delete" key 605. Here, a first terminal monitors that the first user performs a click operation on the option "draw a circle" and the option "Arabic number 1" in the 602 area, and then motion description information selected by the first user, i.e., "draw a circle+Arabic number 1," is displayed in the area 603 at the bottom. The symbol "+" serves as a separator between the two pieces of motion description information.

Further, in the embodiments, the sequence in which the first user sends the business data and the motion data is not limited, so the first user may also send the business data first. After the server receives the business data sent by the first user, in order to conveniently determine the first motion data of the first user, the server may also return, to the first user, the pre-stored motion description information shown in Table 2 as options and determine the first motion data according to a selection result of the first user.

Similarly, if the motion description information sent by the first user does not match the motion description information or keywords pre-stored by the server, the server cannot determine the first motion data. For example, the motion description information sent by the first user is too simple, such as, "draw a line," "draw a point"; or the server does not pre-save corresponding motion description information, for example, the motion description information sent by the first user is "delta." Therefore, the server may also return, to the first user, the pre-stored motion description information shown in Table 2 as options and determine the first motion data according to a selection result of the first user.

For example, when the server B receives business data sent by a first terminal A, the motion description information in Table 2 may be returned to the first terminal A as options, so that the first terminal A returns the selection results of the first user to the server B. For example, the selection results are "English letter a," "English letter b," and "Arabic number 1." Then, the server B may determine the corresponding motion data according to Table 3 and determine the first motion data of the first terminal A as motion data n, motion data n+2, and motion data 1 in the sequence of the motion description information.

Figure 3B:
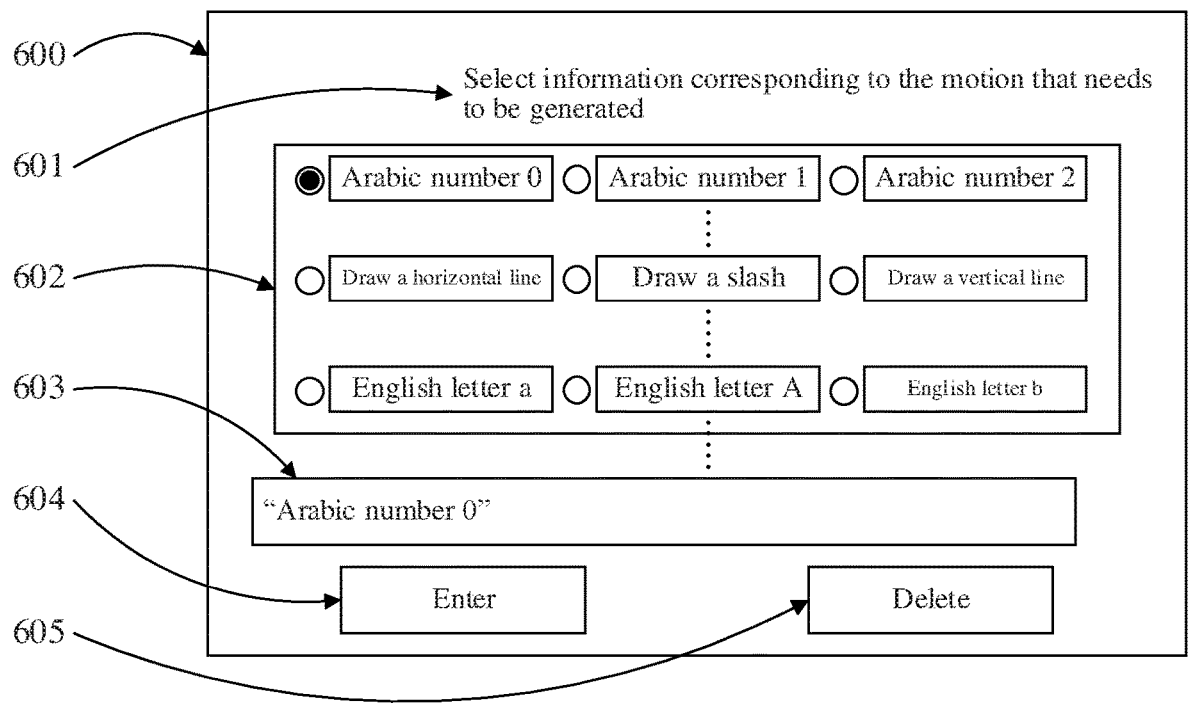

For example, the server may return, to the first user, every piece of motion description information as an option in the form of query information, as shown in FIG. 3b.

FIG. 3b is a schematic diagram of query information according to some embodiments. Here, it can be seen that an option interface 600 includes: prompt information "Select information corresponding to the motion that needs to be generated" 601, a selection interface 602 containing motion description information as options, a display area 603 for selected motion description information, an "Enter" key 604 and a "Delete" key 605. Here, a first terminal monitors that the first user performs a click operation on the option "Arabic number 0" in the 602 area, and then the selected motion description information, i.e., "Arabic number 0," is displayed in the area 603 at the bottom.

In addition, because different people are different in body figure (for example, in height and weight), when different people do the same set of motions, the resulting motion data may be different; therefore, in order to reduce the impact of individual differences in the subsequent data calling process and increase the success rate of the matching of second motion data and first motion data, the server may determine, for one piece of motion description information, a plurality of pre-stored motion data as the first motion data sent by the first user. For example, when the motion description information is "draw a circle," the server may determine that motion data corresponding to a circular motion track and motion data corresponding to oval motion track are first motion data, and the like.

Further, the server may also determine, according to the received first motion data of the first user and from pre-stored pieces of motion data, motion data with a similarity to the first motion data higher than a preset threshold as first motion data sent by the first user.

For example, when a motion uploaded by the first user is a motion of drawing a circle, because the motion of the first user is not standard, and a motion track corresponding to first motion data actually received by the server is more similar to an oval, the server may determine, according to pre-stored motion data, a piece of pre-stored motion data with the highest similarity to the first motion data, for example, motion data corresponding to a circular motion track, and then use the pre-stored motion data with the highest similarity as first motion data, and establish an association relationship between the first motion data and business data. If the motion track corresponding to the first motion data uploaded by the first user is more similar to an oval, the server may determine motion data corresponding to an oval motion track as first motion data. Alternatively, the server may also determine both the motion data corresponding to the circular motion track and the motion data corresponding to the oval motion track as first motion data.

When determining, according to the pre-stored motion data, motion data with a similarity to the first motion data sent by the first user higher than the preset threshold, the server may also return, to the first user, the determined motion data with a similarity higher than the preset threshold, and determine to-be-stored first motion data according to motion data selected by the first user.

Further, since the first motion data sent by the first user may be repeated execution of the same motion (for example, drawing 4 circles, which means repeating the motion of drawing a circle four times), in order to facilitate the determination, by the first user, of the number of repetitions of the first motion data, the first motion data determined by the server may also include the number of repetitions.

Moreover, when obtaining the business data provided by the first user, the second user also needs to repeatedly perform the motion, so that second motion data sent by a second terminal to the server can match the first motion data. It takes a certain time to repeat the motion many times. For example, when the first motion data is "draw a circle" and the number of repetitions is 100, the second user needs to take a certain time to complete second motion data that matches the first motion data.

Therefore, the first motion data sent by the first user may further include a collection duration, so that the server matches second motion data received within the collection duration with the first motion data. For example, if the collection duration of the first motion data sent by the first user is 1 hour, the server may determine whether second motion data sent by the second user and received within 1 hour matches the first motion data, during the subsequent data calling process. Here, the server may calculate similarity between second motion data and first motion data and determine second motion data with a similarity higher than a preset threshold and may further accumulate the quantity of second motion data with a similarity higher than the preset threshold. In other words, the server may determine that second motion data matches first motion data when determining that the quantity of second motion data with a similarity to first motion data sent by the first user higher than the preset threshold meets, within the collection time, the number of repetitions sent by the first user.

Figure 3C:
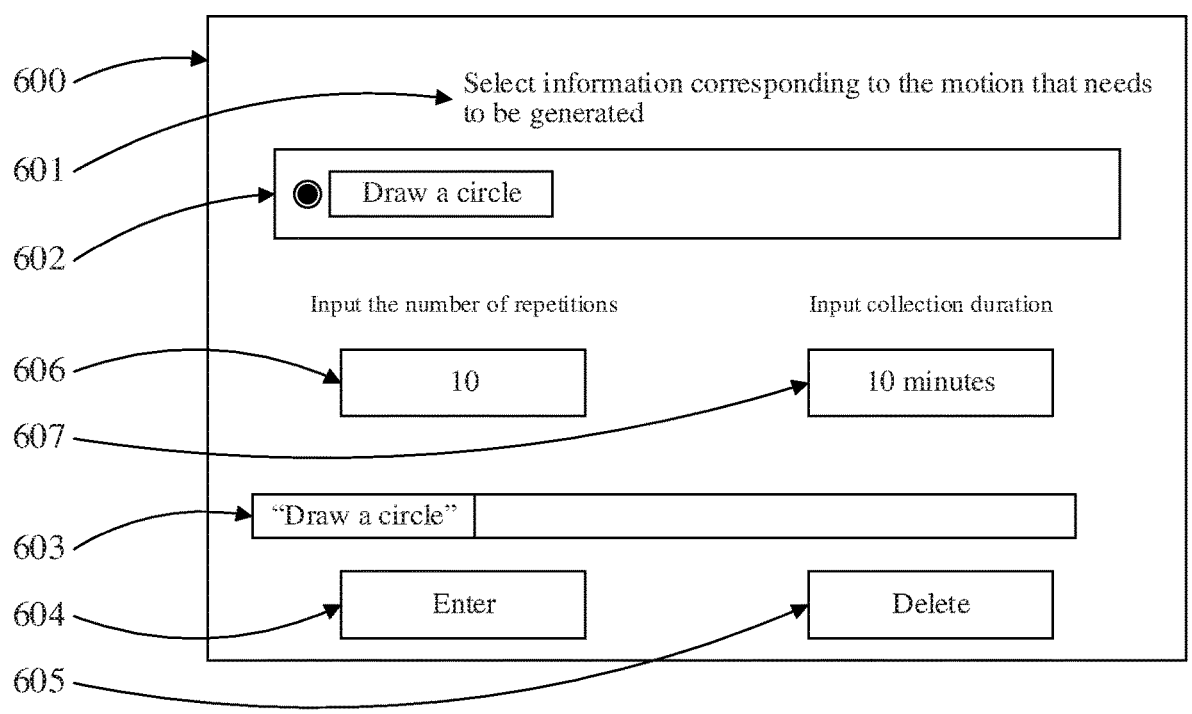

For example, similar to the foregoing process, when the server receives first motion data sent by the first user, the server may further return, to the first user, query information about the number of repetitions of the first motion data and the collection duration, as shown in FIG. 3c. The sever then respectively determines, according to the number of repetitions as well as the collection duration selected by the first user, the number of repetitions of first motion data and the duration of receiving second motion data.

FIG. 3c is a schematic diagram of query information according to some embodiments. Here, it can be seen that an option interface 600 includes: prompt information "Select information corresponding to the motion that needs to be generated" 601, a selection interface 602 containing motion description information as options, a display area 603 for selected motion description information, an "Enter" key 604, a "Delete" key 605, an input box 606 for the number of repetitions, and an input box 607 for duration. Here, the first terminal monitors that the first user inputs 10 in the input box 606 for the number of repetitions in the area 606 and input 10 minutes in the duration input box 607. Then, the server may determine, according to the selection of the first user, that the first motion data is "draw a circle for ten times" and the collection duration is 10 minutes. Therefore, in the subsequent data calling process, when receiving the motion data that matches the motion description information "draw a circle" and is sent ten times by the second user within 10 minutes, the server determines that the second motion data matches the first motion data and returns business data to the second user.

The foregoing methods for determining the received first motion data sent by the first user may be used alternatively or in any combination, which is not limited here.

Further, in some embodiments, the business data may be text, a picture, etc., or may be a URL. Moreover, the business data may be the same as business data included in a two-dimensional code in the prior art, and the specific content of the business data is not limited here. For example, when the first user needs to obtain business data through the second user and execute a payment operation, the business data may be the URL of a payment page of the first user. Then, after the second user obtains the URL, a payment page for making a payment to the first user may be obtained by accessing the URL to perform the payment operation.

Referring back to FIG. 2, in step S202: an association relationship between the first motion data and the business data is established and stored.

In some embodiments, after the server determines the first motion data and the business data, an association relationship between the first motion data and the business data may be established and stored, so that to-be-called data may be determined according to the above association relationship in the subsequence data calling stage.

For example, the server may directly establish the association relationship between the first motion data and the business data, determined in step S201, and store the first motion data, the business data and the association relationship. Moreover, the first motion data, the business data and the association relationship may be stored in a hard disk of the server or stored in a database corresponding to the server, which is not limited here.

Through the data storage process as shown in FIG. 2, the server may receive the first motion data and the business data sent by the first user, establish an association relationship between the first motion data and the business data, and store the association relationship for subsequent data calling.

In addition, as mentioned above, modern society is in the era of data explosion, and new data is being generated all the time in the network. Therefore, through the data storage process shown in FIG. 2, the server may store a large amount of first motion data and its associated business data.

When there is first lotion data with high similarity or the same first motion data in the first motion data stored in the server, in the subsequent data calling process, the server may determine multiple pieces of matched first motion data according to the received second motion data, and return, to the second user, business data respectively associated with the multiple pieces of first motion data. Thus, the second user may receive multiple pieces of business data, but the business data that the second user needs to obtain is usually only one of them. Not only is the amount of data transmission between the server and the second user increased, but also the second user needs to select the required business data from the multiple pieces of business data, which may result in poor user experience.

Therefore, in order to reduce the quantity of first motion data for matching the second motion data in the data calling process, after receiving the first motion data and the business data, the server may further determine geographical location information of the first user, establish association relationships among the first motion data, the business data and the geographical location information and store the association relationships, so that the quantity of the first motion data for matching the second motion data is reduced in the subsequent data calling process by determining the geographical location information of the second user. The geographical location information herein may be a specific location or a geographical range.

For example, the first user may pre-store geographical location information corresponding to an account of the first user in the server. For example, the first user pre-sends geographical location information to the server through the account, and then the server may establish an association relationship between the account ID of the account and the geographical location information and store the association relationship in a database. Then, the server may call the geographical location information corresponding to the account ID from the database according to the account ID determined in step S201 and associate the geographical location information with the first motion data.

The geographical location information may include longitude and latitude, altitude interval, floor space, terrain profile, etc. Moreover, the latitude and longitude may be the latitude and longitude of the center point of the geographical location information, and the altitude interval is represented by the number of floors.

Figure 4:
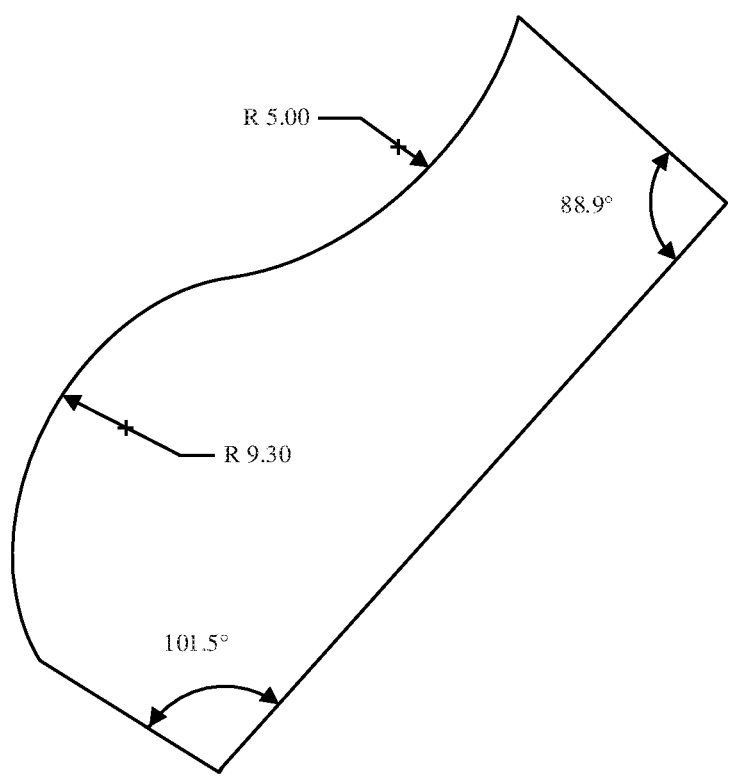
FIG. 4 is a schematic diagram of geographical location information according to some embodiments.

For example, the server B receives the first motion data and the business data sent by the first user through the account A, and the server B calls the corresponding geographical location information from the database according to the ID of the account A, as shown in Table 3. FIG. 4 is a schematic diagram of geographical location information according to some embodiments, which may include illustrated data such as angles, radians, and the like.

TABLE 3

| Geographical location information | Content |
|---|---|
| Longitude and latitude | N39°59'17.30" E116°28'33.96" |
| Altitude interval | 15 m-20 m |
| Floor space | 180 m² |
| Terrain profile | As shown in FIG. 2 |

Further, taking the floor height of 5 m as an example, the altitude interval of 15 m-20 m may also be indicated by four floors.

Further, when the server cannot call the corresponding geographical location information from the database through the account ID determined in step S201 (e.g., the geographical location information corresponding to the account ID is not stored in the database), the server may further determine the geographical location information of the first terminal when the first terminal sends the first motion data or sends the business data by using a method such as GPS or base station positioning, as geographical location information associated with the first motion data.

Here, when the server determines that the geographical location information is only the latitude and longitude information, the server may supplement the geographical location information associated with the first motion data according to a preset range.

Figure 5A:
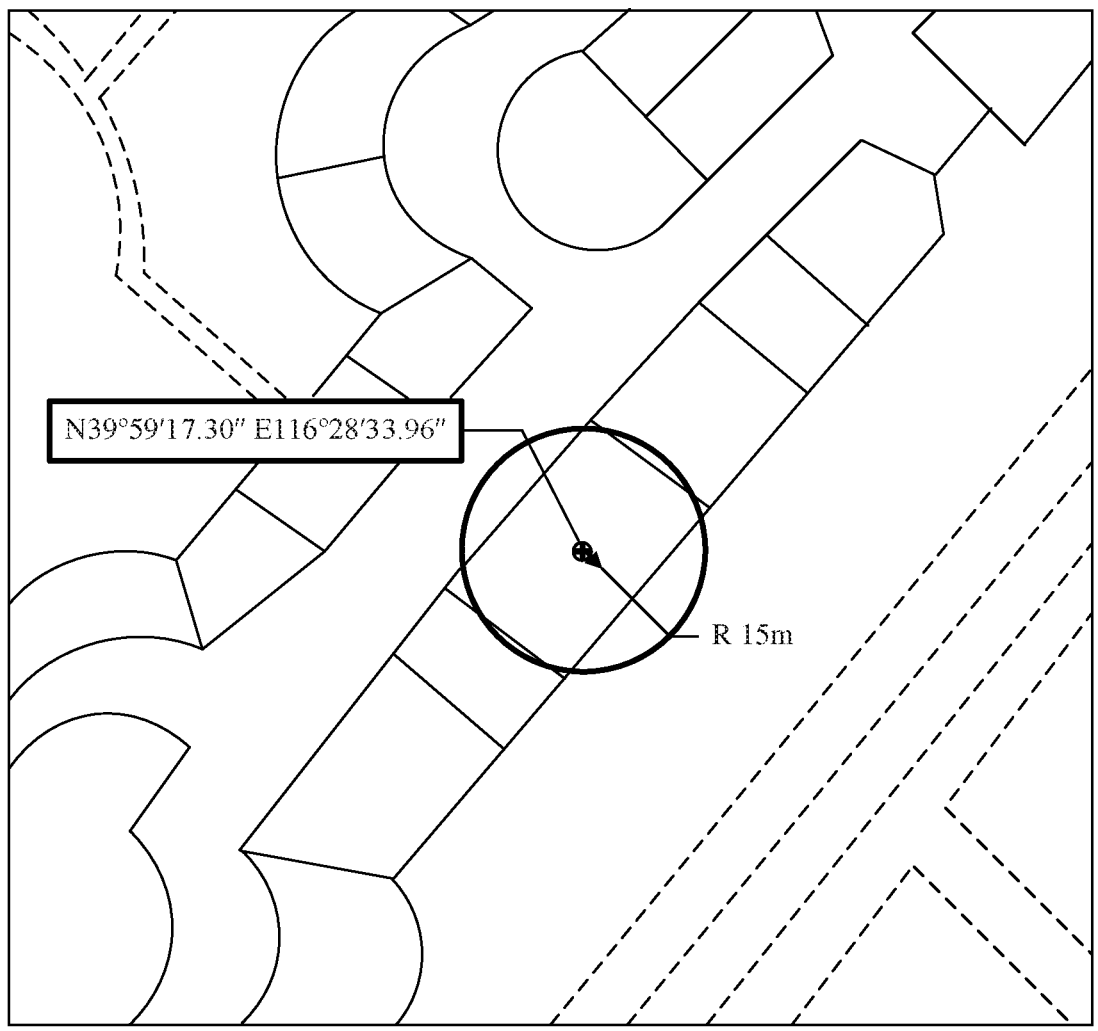
FIG. 5a and FIG. 5b are schematic diagrams of geographical location information according to some embodiments.
Figure 5B:
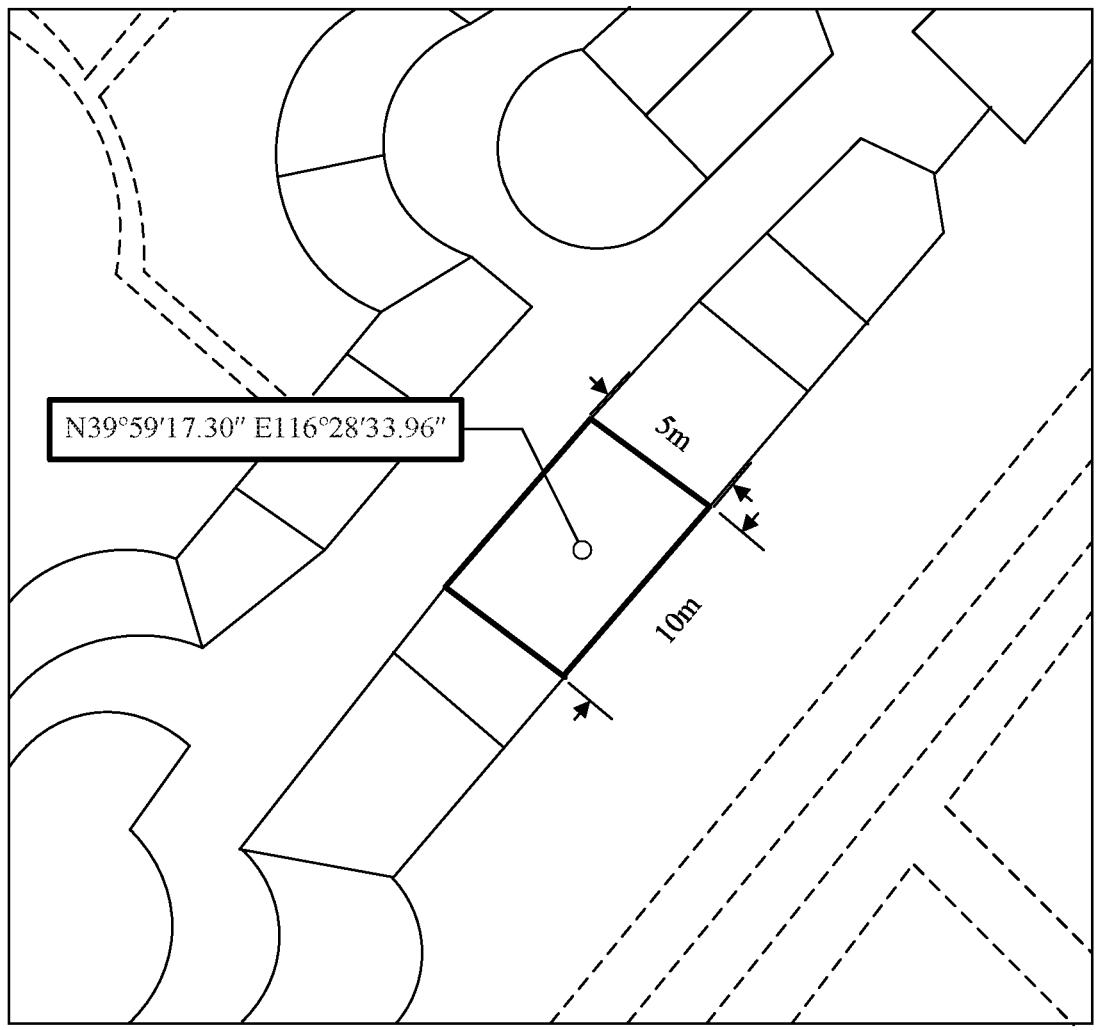

For example, when the first terminal C sends the first motion data and the business data of the first user, the server B obtains the geographical location information as N39° 59' 17.30", E116° 28' 33.96". Assuming that the preset range is a circle with a radius of 15 m, the server can supplement the geographical location information as shown in FIG. 5a, where the circle is the geographical location information of the first user after the supplement, and the thin solid lines illustrate the shapes of rooms in an electronic map and dotted lines illustrate roads. If the preset range is a rectangle with a long side of 10 m and a short side of 5 m, the server may determine that the geographical location information may be as shown in FIG. 5b, and the rectangle defined by the thick solid lines is the supplemented geographical location information.

Further, when the geographical location information further includes an altitude, the preset range may further include an altitude interval, and the supplemented geographical location information may be a closed space. For example, the preset range is determined by the common floor height, the floor height of a building at the latitude and longitude, or the building height at the latitude and longitude, and then the altitude interval of the geographical location information is determined.

Figure 6A:
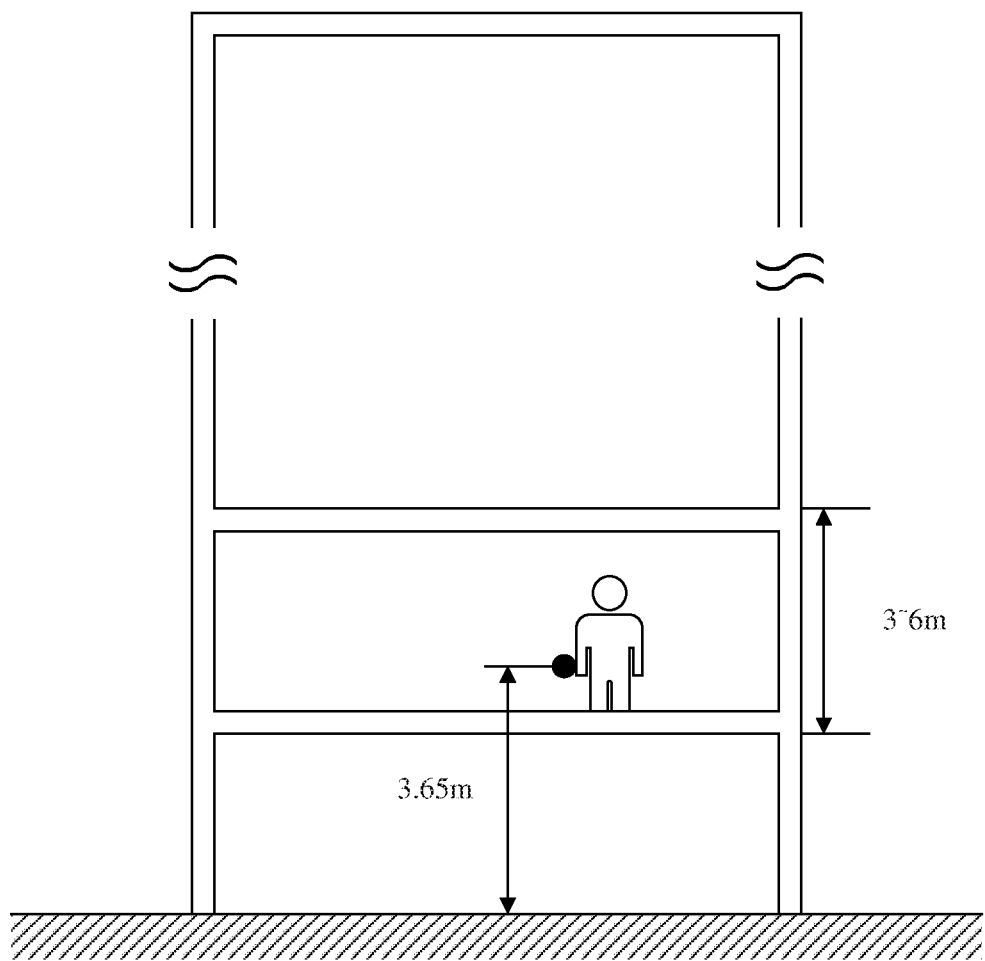
FIG. 6a and FIG. 6b are schematic diagrams of geographical location information according to some embodiments.
Figure 6B:
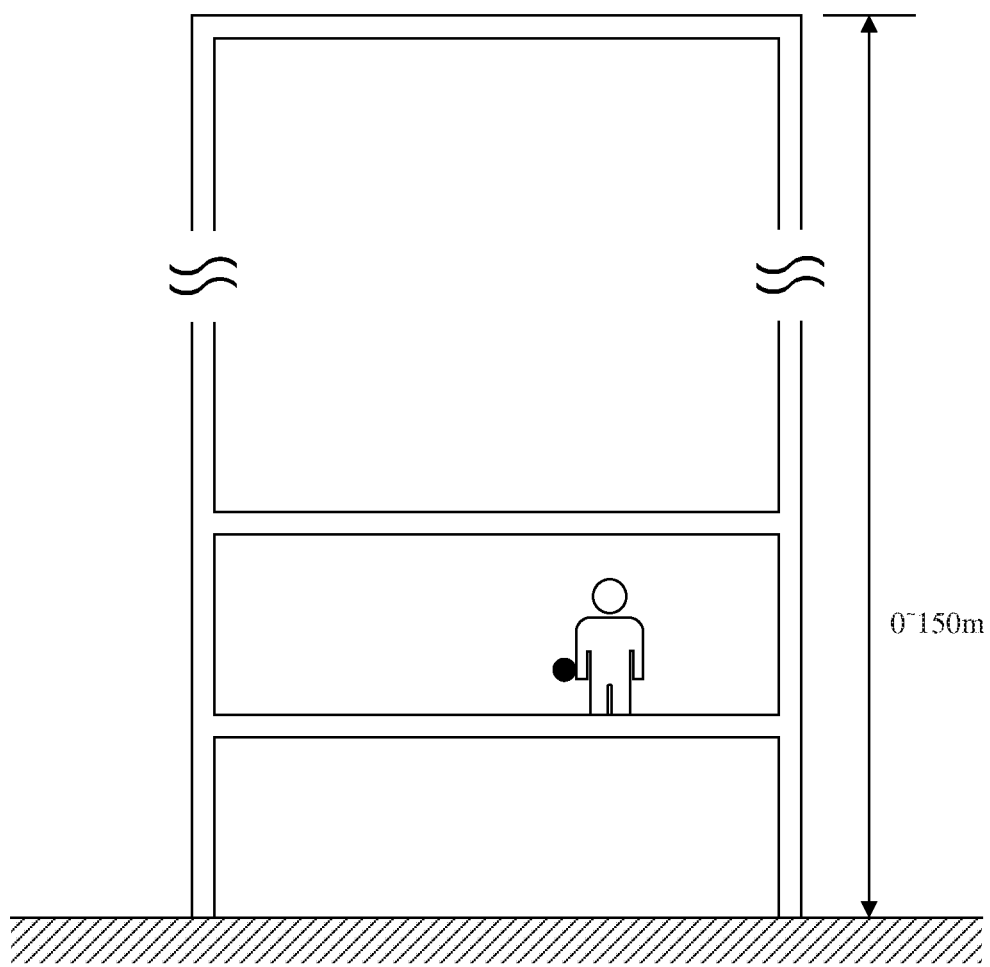

In FIG. 6a, the server may pre-store a plurality of intervals corresponding to common floor heights of buildings. When the received geographical location information of the first user includes an altitude, the server may determine a height interval in which the altitude falls, as an altitude interval corresponding to the geographical location information of the first user. For example, the geographical location information of the first user determined by the server includes altitude data of 3.65 m, and the pre-stored altitude interval includes 0-3 m, 3-6 m, 6-9 m, etc., then the server may determine the altitude interval in the geographical location information of the first user as 3 m to 6 m. In FIG. 6b, the server determines that the geographical location information of the first user does not include altitude data, and the server may further determine the height of a building corresponding to latitude and longitude in the geographical location information as 150 m, and then determine that the altitude interval of the geographical location information of the first user is 0 m to 150 m. The height of the building corresponding to the latitude and longitude may be the height of the highest point inside the building, or the height of the highest point outside the building. The height of a building is not limited here.

It may be seen that, by using the step S202, the geographical location information associated with the first motion data may be determined as a stereoscopic space, and then, in the subsequence data calling process, as long as second motion data that matches the first motion data is received in the stereoscopic space of the geographical location information, the server may call associated business data and return the associated business data.

In some embodiments, since the server may establish association relationships among the first motion data, the business data and the geographical location information, and store the association relationships, and any first user who provides business data may send first motion data to the server, the server may store multiple association relationships. Then, the association relationships stored by the server are represented on an electronic map as shown in FIG. 7.

Figure 7:
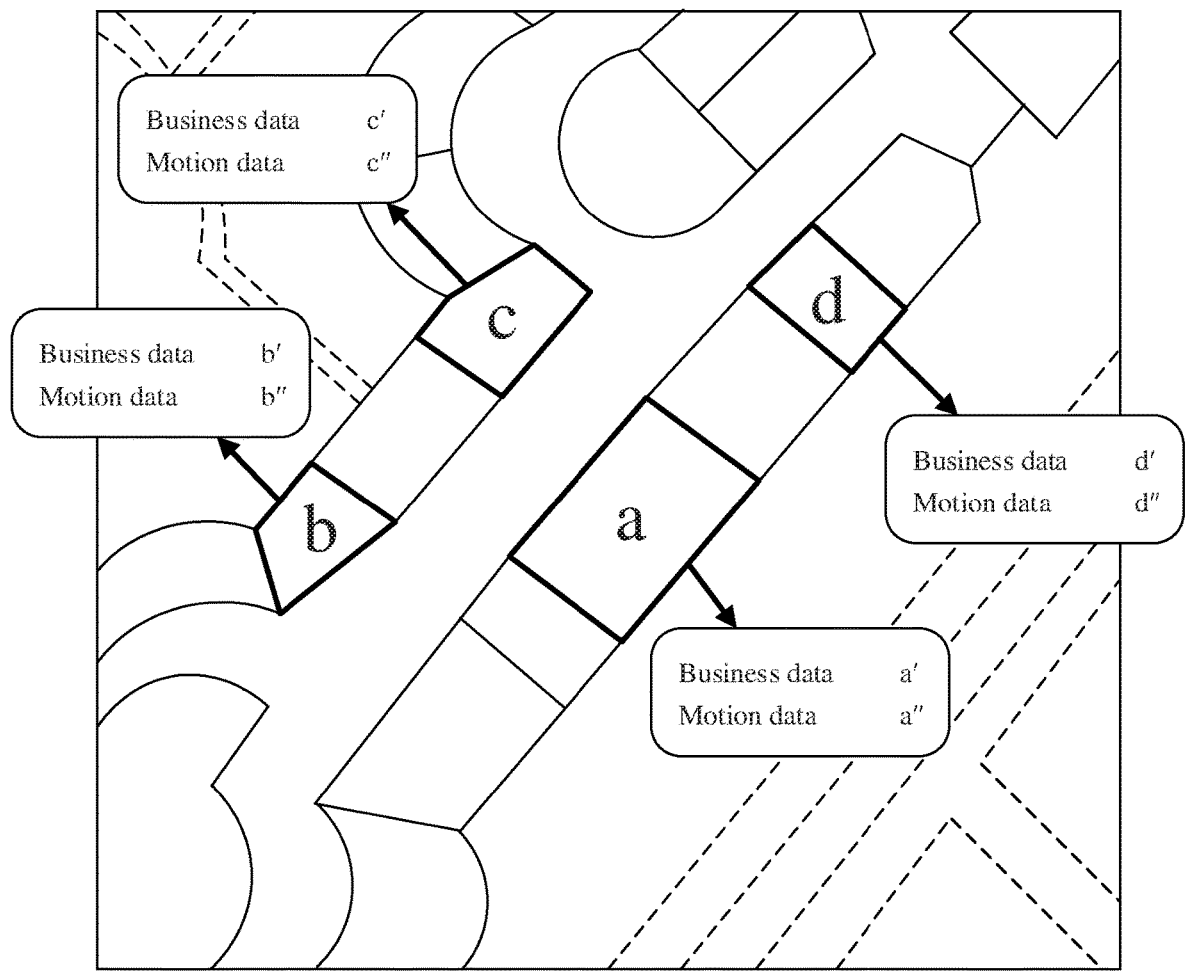
FIG. 7 is a schematic diagram showing stored association relationships on an electronic map according to some embodiments.

FIG. 7 is a schematic diagram showing stored association relationships on an electronic map according to some embodiments. It may be seen that on the electronic trap, there are multiple pieces of geographical location information: a, b, c, and d, and every piece of geographical location information is a closed graph defined by thick solid lines. Moreover, every piece of geographical location information is associated with first motion data and the business data that are not completely identical, respectively, as illustrated in FIG. 5a, the thin solid lines illustrate the shapes of rooms, and the dotted lines illustrate roads.

In addition, in some embodiments, in order to prevent the problem that the second user obtains too much business data during the data calling process if the server stores too much first motion data with high similarity, before establishing the association relationship between the first motion data and the business data in step S202, the server may further determine whether the similarity between the received first motion data and every piece of stored first motion data is higher than a threshold; if yes, the first motion data and its associated business data are not stored; or if not, an associated relationship between the first motion data and the business data is established, and the subsequent operations are continued. Therefore, the problem that there is too much business data matched in the subsequent data calling process because the similarity of the first motion data stored in the server is too high is avoided.

For example, when receiving first motion data sent by the first user, the server may further calculate, for every piece of stored first motion data, the similarity between the first motion data and the first motion data received in step S201, and determine whether there is stored first motion data with a similarity higher than a preset threshold; if yes, the first motion data received in step S201 is not stored, and the first user is notified to change the first motion data; or if not, an association relationship between the first motion data and the business data is established. That is, every time the server receives first motion data sent by the first user, the server may first review the first motion data, and determine whether the similarity between the received first motion data and any stored first motion data exceeds a preset threshold.

Through the above process, the similarity between first motion data stored in the server may not be greater than a preset threshold. However, as the first motion data stored in the server increases, the amount of data that the server needs to match will also increase, resulting in an increase in the operating load of the server. In this case, when the first user uploads first motion data, the probability of existence of first motion data with a similarity to the stored first motion data higher than the preset threshold is also increased; therefore, the first user needs to repeatedly send first motion data, which may reduce the business execution efficiency and result in poor user experience.

Therefore, in some embodiments, when receiving first motion data, the server may further determine the geographical location information of the first user, and when performing similarity calculation on the received first motion data according to stored first motion data, the server only calculates the similarity of first motion data having similar geographical location information. Therefore, the amount of data that needs to be matched is reduced and the business execution efficiency is improved.

For example, after determining geographical location information associated with the first motion data, the server may first determine, from stored geographical location information associated with business data, geographical location information from which the distance to the geographical location information of the first user falls within a specified distance range as adjacent location information, and then determine whether there is motion data whose similarity with the first motion data exceeds a threshold in motion data respectively associated with the pieces of adjacent location information; if yes, the first user is notified to change the first motion data; or if not, association relationships among the first motion data, the business data and the geographical location information are established. Therefore, the server may store multiple pieces of first motion data with a similarity higher than the preset threshold as long as the server determines that the distance between the geographical location information associated with the multiple pieces of first motion data does not fall within a specified distance range. Moreover, in the subsequent data calling process, the server may also first determine stored adjacent location information according to the geographical location information of the second user and determine whether there is first motion data with a similarity to second motion data higher than a threshold in first motion data respectively associated with the adjacent location information.

It should be noted that the motion data respectively associated with every piece of adjacent location information is also first motion data, and may be first motion data uploaded by other first users.

Figure 8:
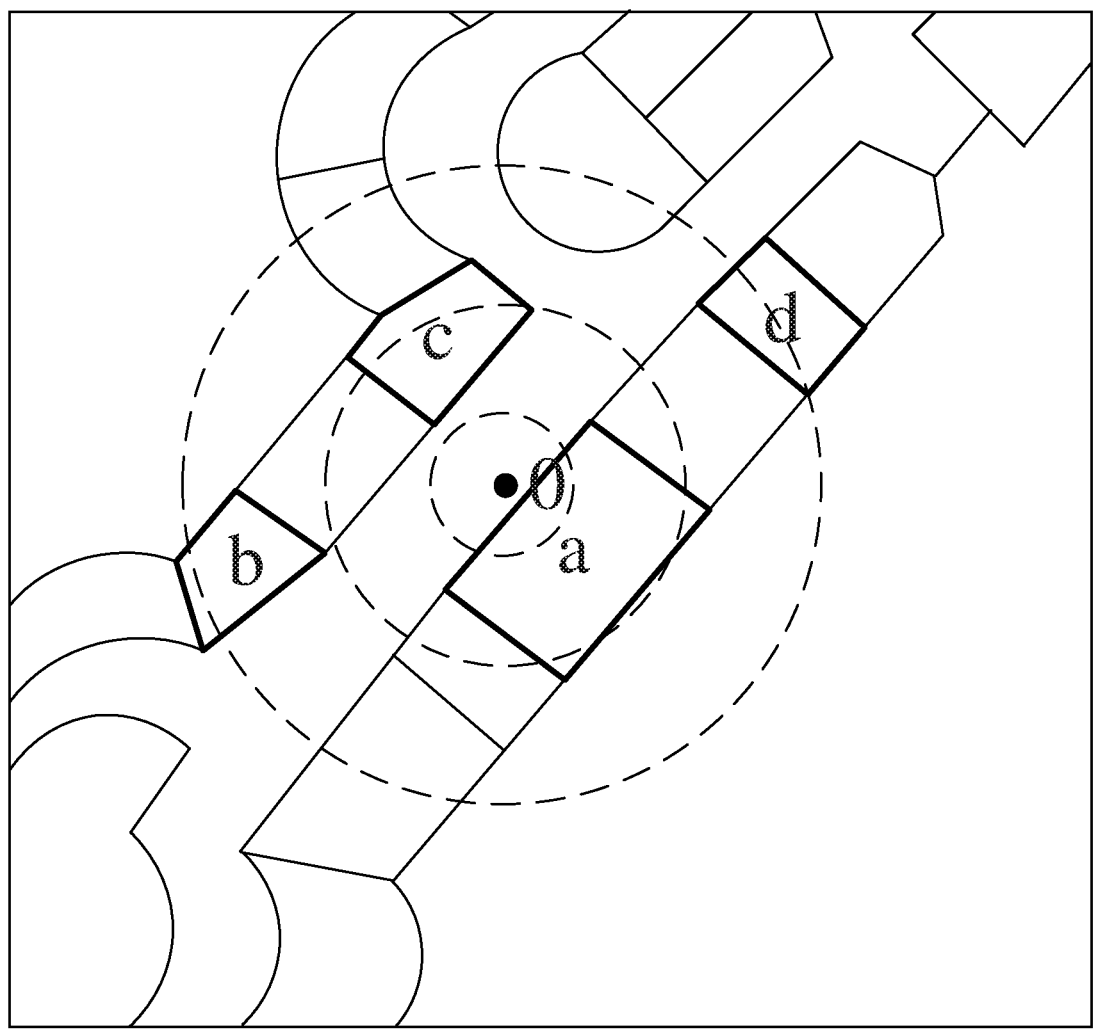
FIG. 8 is a schematic diagram of adjacent location information according to some embodiments.

The specified distance range herein may be set as needed, which will not be limited here. FIG. 8 is a schematic diagram of adjacent location information according to some embodiments. In FIG. 8, by taking the latitude and longitude in the geographical location information of the first user as a center O of a circle and different distance ranges as radiuses, multiple dotted circles can be drawn, the thin solid lines illustrate the shapes of rooms in the electronic map, and the thick solid lines illustrate geographical location information respectively associated with stored business data.

Figure 9:
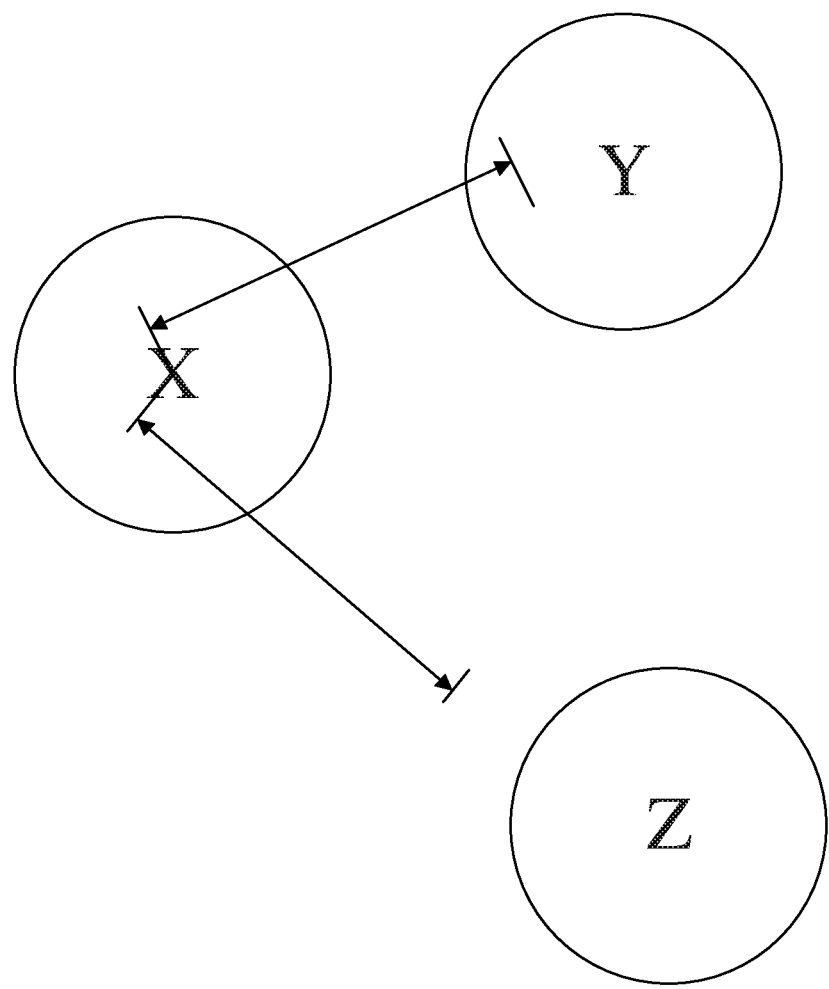
FIG. 9 is a schematic diagram of determining adjacent location information according to some embodiments.

In some embodiments, the geographical location information of the first user may be a geographical range area; therefore, when determining adjacent location information, the server may determine, when a minimum distance between the geographical location information of the first user and geographical location information associated with stored business data is less than a preset distance, the geographical location information associated with the stored business data as adjacent location information. As shown in FIG. 9, the minimum distance between the geographical location information X and the geographical location information Y is less than a preset distance. The minimum distance between the geographical location information X and the geographical location information Z is greater than the preset distance. Then the server may determine that the geographical location information Y is adjacent location information.

In addition, in step S201, the first motion data of the first user may also be determined by an image collected by a camera.

For example, in some embodiments, the first terminal may collect a motion image (e.g., video) of the first user by using a camera of the first terminal, and then the server may receive the motion image of the first user and determine first motion data according to the motion image. For example, the server may determine first motion data corresponding to the motion image by using, e.g., the same method as the prior art, which is not limited here. In some embodiments, the first terminal may also determine first motion data according to the collected motion data and send the first motion data to the server.

Further, in some embodiments, the motion image of the first user may also be collected by cameras of other devices than the first terminal. Then, when receiving the motion image sent by the first user (or first motion data determined by other devices according to collected motion images), the server may determine an account ID logged in on the device. Corresponding geographical location information is determined according to pre-stored correspondence between each account ID and geographical location information, and association relationships among the first motion data, the business data and the geographical location information are subsequently created and stored. In some embodiments, a first terminal and a camera may be two independent devices, and the first terminal may obtain a motion image collected by the camera by external connection, etc., and then the camera may be regarded as the camera of the first terminal. For the same reason, the above expressions are also applicable to other devices and their cameras.

In addition, when the server may not only determine the geographical location information of a device that sends first motion data (or a motion image) but also determine stored location information according to the account ID of the first user, the server may also return, to the first user, query information including the determined geographical location information, so as to establish association relationships among the first motion data, the business data and the geographical location information according to the geographical location information selected by the first user, and store the association relationships.

It should be noted that the steps of the method provided by the embodiments may all be performed by the same device, or the method may also be performed by different devices. For example, step S201 may be performed by a device 1, and step S202 may be performed by a device 2; for another example, step S201 may be performed by the device 2, and step S202 may be performed by the device 1.

Figure 10:
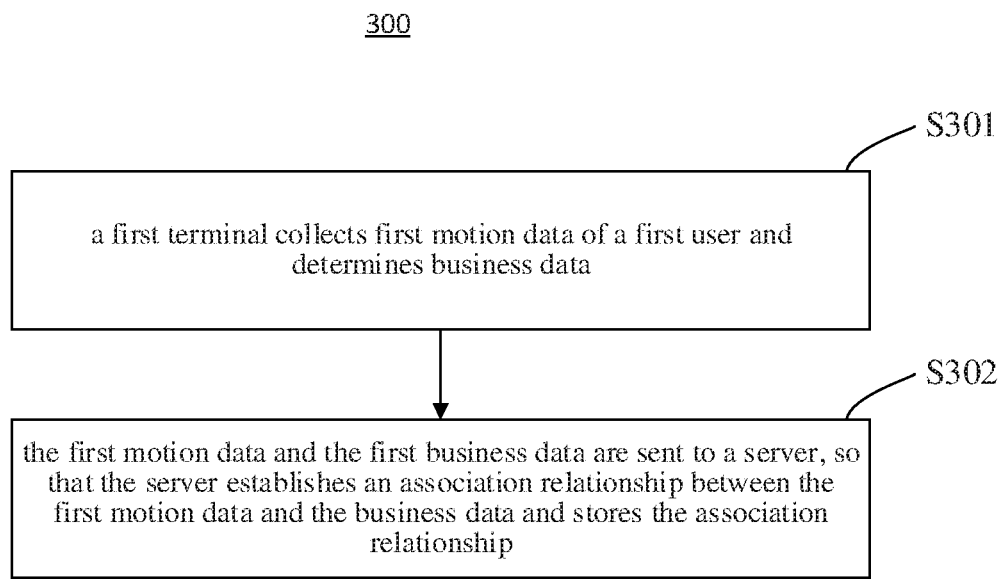
FIG. 10 shows a flow chart of a data storage process according to some embodiments.

FIG. 10 shows a flow chart of a data storage process 300 according to some embodiments. Referring to FIG. 10, the data storage process 300 includes the following steps.

In step S301: a first terminal collects first motion data of a first user and determines business data.

In some embodiments, the first terminal may be a terminal used by the first user, and the first terminal may collect, e.g., the acceleration data and angular velocity data of the first terminal according to the operation of the user and send the data as first motion data to a server.

For example, the first terminal starts data collection when monitoring a long press operation of the first user and stops the collection when the first user stops the long press operation. Alternatively, the first terminal starts data collection when monitoring a start instruction of the first user and ends the collection when monitoring a stop instruction of the first user. How to collect the first motion data is not limited here.

As shown in FIG. 1, the first terminal may monitor motion description information input by the first user and send the information to the server, so that the server determines the first motion data of the first user according to the motion description information.

In addition, the business data may be data input by the first user through the first terminal, or may also be data obtained by the first user through the first terminal (e.g., data obtained through other servers, or received data sent by other terminals, etc.), and how the first terminal determines business data is not limited here.

In step S302: the first motion data and the business data are sent to a server, so that the server establishes an association relationship between the first motion data and the business data and stores the association relationship.

In some embodiments, the first terminal may send the first motion data and the business data to a server, and at the same time, the geographical location information of the first terminal may be sent to the server as the geographical location information of the first user.

The geographical location information herein may be sent by the first terminal actively or may be returned according to the query information of the server, which is not limited here.

Figure 11:
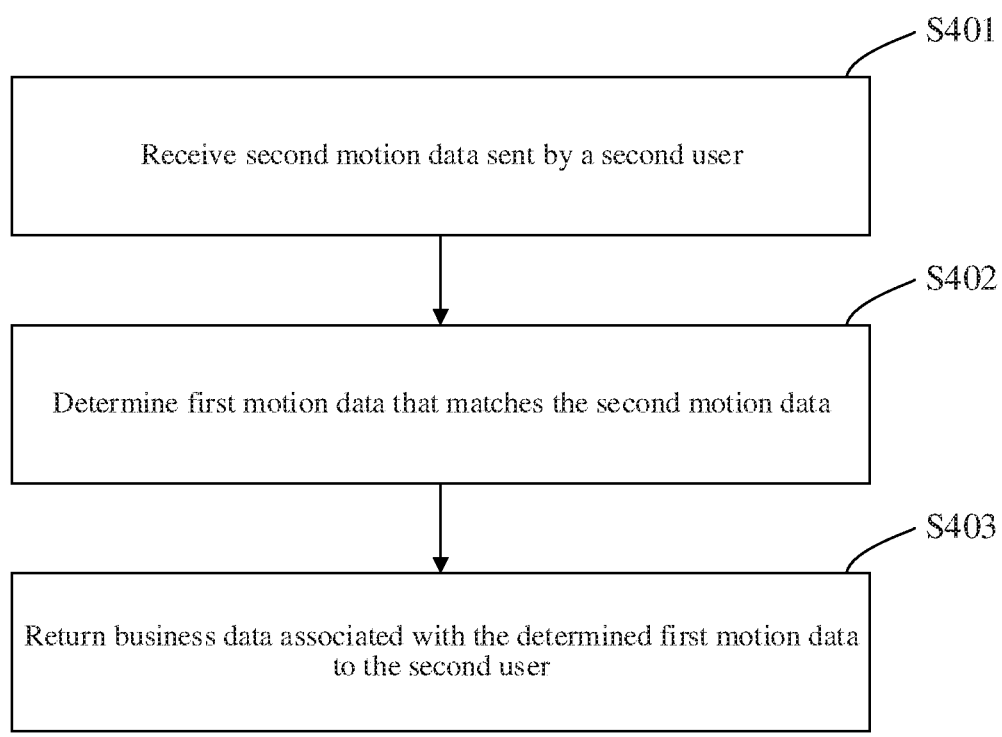
FIG. 11 shows a flow chart of a data calling process according to some embodiments.

Based on the data storage method shown in FIG. 2, embodiments of the specification further correspondingly provide a data calling method, as shown in FIG. 11.

In some embodiments, as shown in FIG. 2, the first user uploads first motion data and business data to the server, so that the server stores the data, e.g., as shown in FIG. 7. Therefore, in order to enable other users (e.g., the second user) to obtain the associated business data by performing the same motion, the first user may post a motion description image, post a motion description text, broadcast a motion description audio, play a motion demonstration video, etc., thereby prompting other users to obtain business data by completing the motion.

Figure 12:
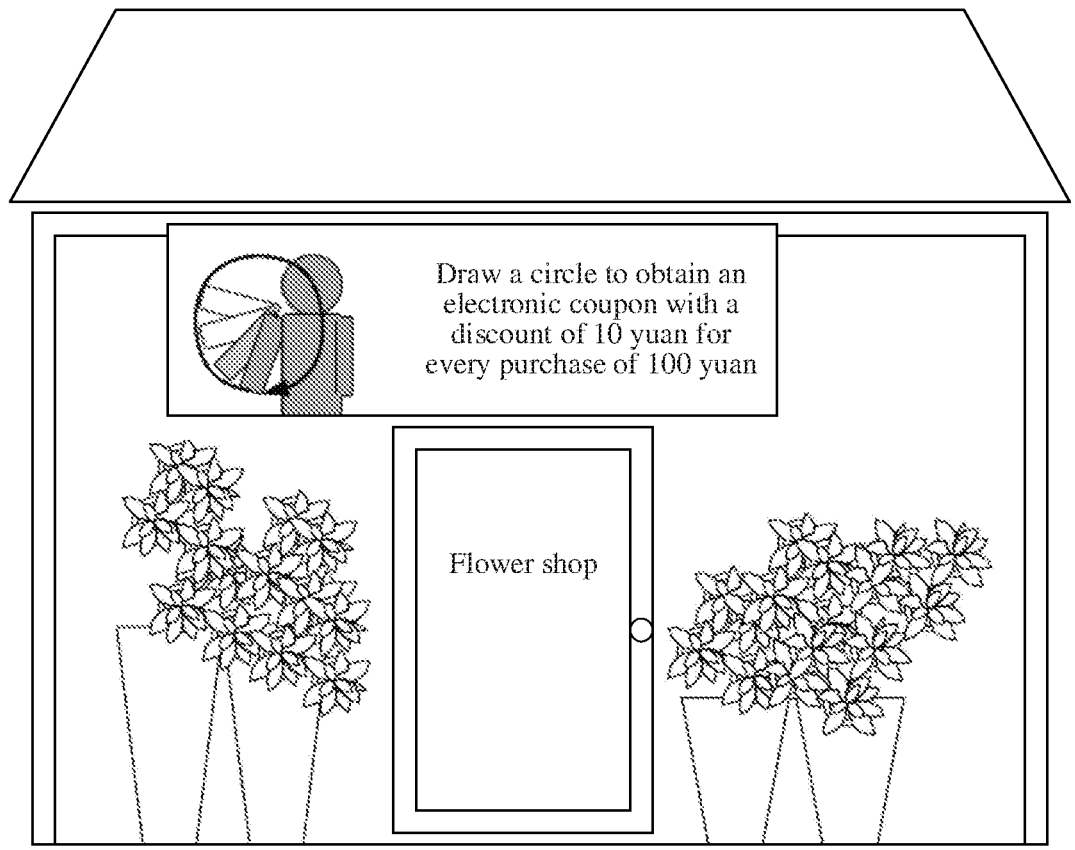
FIG. 12 is a schematic diagram of suspending prompt information according to some embodiments.

For example, taking a flower shop as an example, it is assumed that the manager of the flower shop completes the motion of drawing a circle by using a mobile phone, and sends an electronic coupon with a discount of 10 yuan for every purchase of 100 yuan as business data to the server B. Then, the server B may determine the location of the store as first motion data geographical location information and establish association relationships among the first motion data corresponding to the motion of drawing a circle, the business data and the geographical location information, and store the association relationships. Then, the store manager can suspend prompt information at the door of the store, as shown in FIG. 12, prompting users to obtain the electronic coupon with a discount of 10 yuan for every purchase of 100 yuan (i.e., business data) by completing a specified motion (i.e., the motion of drawing a circle). Then, other users can obtain the electronic coupon just by completing the motion of drawing a circle near the store rather than scanning an identification code at a short distance.

FIG. 11 shows a flow chart of a data calling process 400 according to some embodiments. Referring to FIG. 11, the data calling process 400 includes the following steps:

In step S401: second motion data sent by a second user is received.

As described in step S201, the server may store multiple association relationships between business data and first motion data, so that the server may call associated business data and returns the associated business data to the second user after the second user completes the motion that matches the first motion data. Diversified data obtaining methods are provided to solve the problem that the user's desire to obtain data is not high, resulting in low efficiency in obtaining data.

In some embodiments, if the second user is a user who needs to obtain data, the server may receive second motion data sent by a second terminal of the second user, and perform subsequent matching on the second motion data to determine data to be returned to the second user. The second terminal herein is a terminal used by the second user.

In step S402: first motion data that matches the second motion data is determined.

In some embodiments, when receiving first motion data, the server may determine, according to stored first motion data, first motion data that matches the second motion data, so that business data associated with the matched first motion data is returned to the second user.

For example, for every piece of stored first motion data, similarity calculation is performed between the first motion data and the second motion data to determine whether the similarity is higher than a preset threshold; if yes, is determined that the first motion data matches the second motion data; or if not, it is determined that the first motion data does not match the second motion data.

When there is no first motion data matching the second motion data, the server may return error information to the second user, prompting the second user to resend the second motion data.

The algorithm for performing similarity calculation herein may be obtained by training samples based on a neural network or a hidden Markov model. For example, the training may be performed in the same manner as in the prior art, and the preset threshold may also be set as needed, which is not limited here.

In addition, regardless of the first user or the second user, even though they know what motion to do, they may still do some preparatory motions when doing the motion. For example, when a user is accustomed to starting from the upper left while writing, the preparation motion may be a motion of lifting the pen. Or, there will be an intermediate motion after finishing the first character and before writing the second character or while doing two discontinuous motions. The additional motions such as the above-mentioned motion of lifting the pen or intermediate motion may be referred to as preparatory motions. In some embodiments, in order to reduce the influence of the preparatory motions on the similarity calculation result, samples of preparatory motions may be added, so that when receiving motion data sent by a user, the server may identify, according to the samples of preparatory motions, motion data corresponding to the preparatory motions in the motion data and remove the motion data, thereby further improving the accuracy of the calculated similarity. Before performing the similarity calculation, the server may also remove, from first motion data and second motion data, the motion data corresponding to the preparatory motions according to the samples of preparatory motions, which is not limited here.

In step S403: business data associated with the determined first motion data is returned to the second user.

In some embodiments, after determining first motion data that matches the second motion data, the server may call business data associated with the matched first motion data and return the business data to the second user.

For example, after determining the matched first motion data, the server may further determine a data ID corresponding to the business data associated with the matched first motion data, and return, to the second terminal and according to the data ID, query information about whether to obtain business data corresponding to the data ID, and finally, return the business data corresponding to the data ID to the second user according to response information returned by the second user. The response information herein may indicate confirmation or cancellation for the obtaining of the business data.

In addition, since there may be multiple pieces of first motion data for matching, there may be multiple pieces of first motion data with a similarity higher than a preset threshold, and the server may determine business data respectively associated with multiple pieces of matched first motion data.

Therefore, in some embodiments, the server may further send data IDs of business data associated with the determined pieces of first motion data to the second user, and according to a data ID selected by the second user, return business data corresponding to the data ID selected by the second user.

Figure 13A:
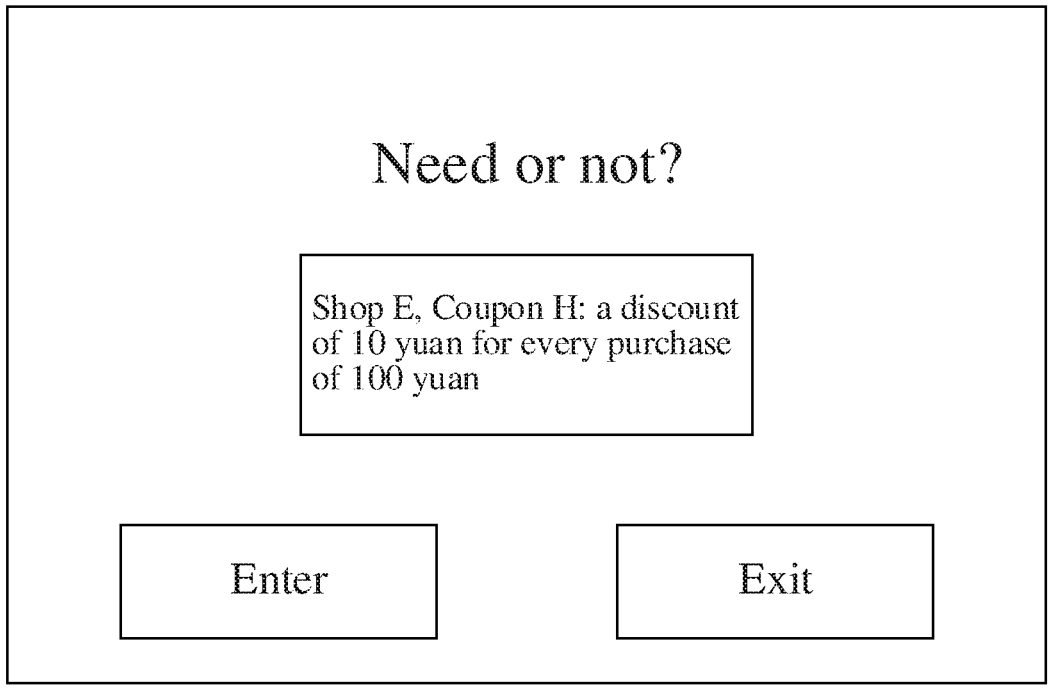
FIGS. 13a and 13b are schematic diagrams of query information according to some embodiments.
Figure 13B:
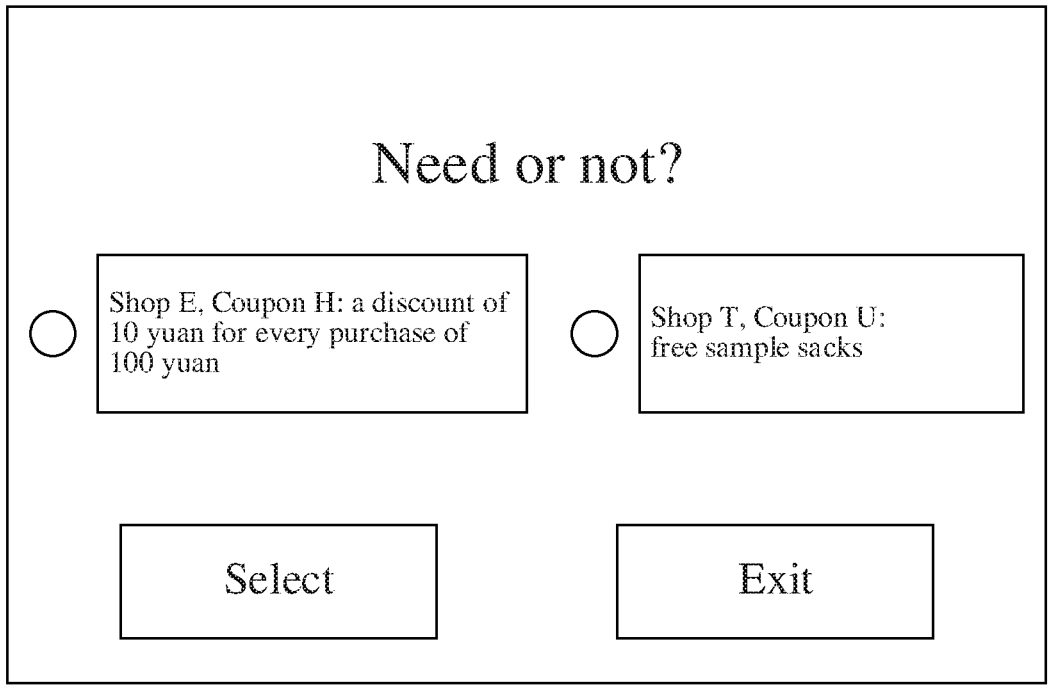

Here, the server may return query information to the second user, as shown in FIG. 13a and FIG. 13b. FIG. 13a is a schematic diagram of query information returned by the server when there is only one piece of first motion data with a similarity higher than a preset threshold. It may be seen that, according to the query information, shown in FIG. 13a, which includes a data ID corresponding to the business data, that is, "Shop E, Coupon H: a discount of 10 yuan for every purchase of 100 yuan," the second terminal may return response information to the server by monitoring the operation of the second user. FIG. 13b is a schematic diagram of query information returned by the server when there are multiple pieces of first motion data with a similarity higher than a preset threshold. It may be seen that FIG. 13b shows selection of query information, which includes data IDs respectively corresponding to two different pieces of business data, namely, "Shop E, Coupon H: a discount of 10 yuan for every purchase of 100 yuan," and "Shop T, Coupon U: free sample sacks." Then, the second terminal may determine a selection result by monitoring the operation by the second user on the query information and return the selection result to the server.

Based on the data calling method shown in FIG. 11, in the case of data calling, the server may receive second motion data sent by the second user, and when at least one piece of first motion data that matches the second motion data is determined, business data associated with the matched first motion data is returned to the second user. It may be seen that, by using the methods provided here, as long as the second user performs a motion matching the first motion data and sends, to the server, second motion data corresponding to the motion, corresponding business data may be obtained from the server, and the efficiency of obtaining data is improved and a new method for obtaining data is provided to users.

In addition, in some embodiments, the server may also determine the geographical location information of the first user, establish association relationships among the first motion data, the business data and the geographical location information, and store the association relationships. Therefore, in the data calling process shown in FIG. 11, the server may also determine the geographical location information of the second user and reduce the quantity of first motion data for matching.

For example, the server may first obtain the geographical location information of the second user. Next, from stored geographical location information respectively associated with pieces of first motion data, geographical location information from which the distance to the geographical location information of the second user falls within a specified distance range is determined as adjacent location information. From first motion data respectively associated with the pieces of adjacent location information, the first motion data that matches the second motion data is then determined. Finally, the business data associated with the determined first motion data is returned to the second user.

Here, for obtaining the geographical location information of the second user, the server determines, by using a method such as GPS or base station positioning, the geographical location information of the second terminal when the second user sends the second motion data. For example, the geographical location information may be latitude and longitude data of the second terminal. The second terminal may actively obtain and send geographical location information to the server, or the server may, after receiving the second motion data, enable the second terminal to collect and return geographical location information, by sending a geographical location request to the second terminal. The embodiments do not limit how to obtain the geographical location information, and the geographical location information may be any geographical location information of the second terminal when the second user sends the second motion data.

In addition, when determining the geographical location information of the second user in the latter manner, the server may determine whether a time interval between the time of receiving the geographical location information and the time of receiving the second motion data is less than a preset duration, and if yes, it is determined that the geographical location information is the geographical location information of the second user, or if not, it is determined that the geographical location information is not the geographical location information of the second user and the second user is notified to reseed the second motion data. The preset duration may be set as needed, which will not be limited here.

Further, in some embodiments, after receiving the geographical location information of the second user, the server may determine geographical location information from which the distance to the geographical location information of the second user falls within a specified distance range as adjacent location information, and determine, from first motion data respectively associated with the pieces of adjacent location information, first motion data that matches the second motion data. For example, it may be similar to the process of determining the adjacent location information shown in FIG. 8 and FIG. 9 and thus will not be elaborated.

For example, the server may determine, through step S401, that the second user needs to obtain business data, and the server may store the data as shown in FIG. 7 through the data storage process shown in FIG. 2; therefore, the server may further determine that business data that the second user needs to obtain is business data in an adjacent area of the geographical location information of the second terminal as shown in, for example, an scenario shown in FIG. 12. Here, there may be multiple pieces of geographical location information from which the distance to the geographical location information of the second user falls within a specified distance range, and then multiple pieces of first motion data may be determined by the server.

Here, latitude and longitude may be included in the geographical location information of the second user, so the server may determine adjacent location information by using the latitude and longitude as a center and the specified distance range as a radius. In addition, if it is determined that there is no adjacent location information, the server may expand the specified distance range until determining adjacent location information or return error information to the second user without performing subsequent steps.

It may be seen that by determining the geographical location information of the second user, the server may further reduce the quantity of first motion data for matching second motion data, thus ensuring a higher matching efficiency.

It should be noted that the steps of the method provided by the embodiments may all be performed by the same device, or the method may also be performed by different devices. For example, step S401 and step S402 may be performed by a device 1, and step S403 may be performed by a device 2; for another example, step S401 may be performed by the device 1, and step S402 and step S403 may be performed by the device 2, etc.

Figure 14:
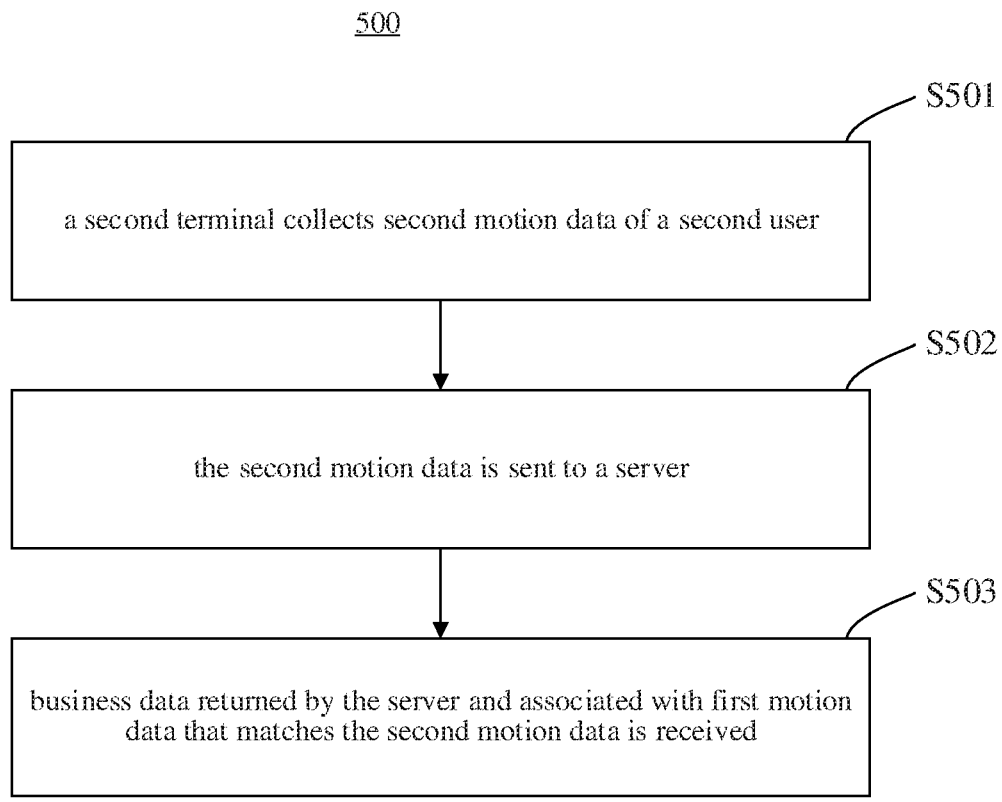
FIG. 14 is a flow chart of a data calling process according to some embodiments.

Based on the data storage method shown in FIG. 10 and the data calling method shown in FIG. 11, embodiments of the specification further correspondingly provide a data calling method, as shown in FIG. 14.

FIG. 14 is a flow chart of a data calling process 500 according to some embodiments. Referring to FIG. 14, the data calling process 500 includes the following steps:

In step S501: a second terminal collects second motion data of a second user.

In step S502: the second motion data is sent to a server.

In step S503: business data returned by the server and associated with first motion data that matches the second motion data is received.

In some embodiments, the above steps S501 to S503 are a data calling process by the second terminal and corresponding to the data calling process shown in FIG. 11. Here, the process of collecting the second motion data of the second user by the second terminal in step S501 may be similar to the process of collecting the first motion data of the first user by the first terminal in step S301 in the data storage process shown in FIG. 10 and will not be elaborated. The second motion data herein may be acceleration data and angular velocity data arranged in a chronological order.

In addition, in step S502, the second terminal may further collect geographical location information of the second terminal, and send the geographical location information to the server, and the server may perform the process of further reducing, through the geographical location information of the second user, the quantity of first motion data for matching in the above data calling process shown in FIG. 11, thereby improving the matching efficiency and further improving the efficiency of the second terminal obtaining data.

Further, in step S503, after receiving the business data returned by the server, the second terminal may monitor the operation by the second user on the business data and perform corresponding business. For example, with the business data shown in FIG. 12, the second terminal may monitor the operation by the second user on the electronic coupon, and assuming that the second user uses the electronic coupon, then the second terminal may send the electronic coupon to a corresponding payer, and so on. The embodiments do not limit how the subsequent steps are implemented.

In addition, when there are multiple pieces of first motion data that match the second motion data, the second terminal may further receive data IDs corresponding to business data associated with the matched first motion data and returned by the server, for example, the query interface as shown in FIG. 13b. The query interface herein may include a selection interface for the data IDs corresponding to the business data associated with the matched first motion data and each data ID corresponds to an option.

The second terminal may also monitor the selection operation by the second user on each option in the query interface, and return a data ID selected by the second user to the server so that the server determines the business data to be returned according to the data ID selected by the second user, and then further receives the business data returned by the server.

Figure 15:
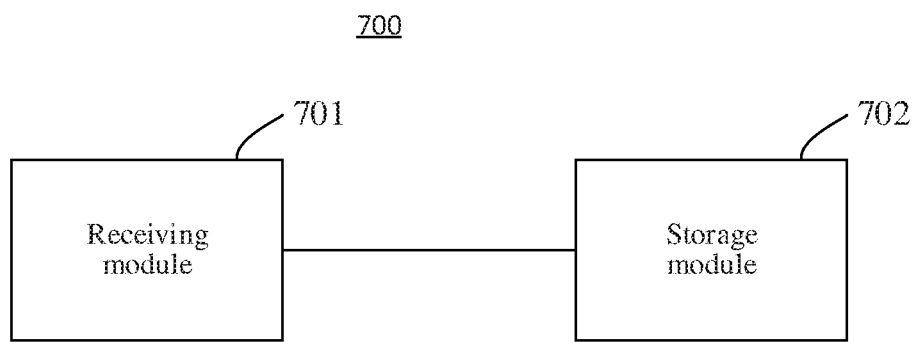
FIG. 15 is a schematic diagram of a data storage device according to some embodiments.

Based on the data storage method shown in FIG. 2, embodiments of the specification further correspondingly provide a schematic diagram of a data storage device, as shown in FIG. 15.

FIG. 15 is a schematic diagram of a data storage device 700 according to some embodiments. Referring to FIG. 15, the data storage device 700 includes: a receiving module 701 for receiving first motion data and business data sent by a first user; and a storage module 702 for establishing an association relationship between the first motion data and the business data and storing the association relationship.

The storage module 702 determines geographical location information of the first user, establishes association relationships among the first motion data, the business data and the geographical location information, and stores the association relationships.

The receiving module 701 receives motion description information sent by the first user, and determines, from pre-stored pieces of motion data, motion data corresponding to the motion description information as received first motion data.

The business data includes text, a picture and a URL.

The storage module 702 determines, from stored geographical location information associated with business data, geographical location information from which the distance to the geographical location information of the first user falls within a specified distance range as adjacent location information, and then determines whether there is motion data whose similarity with the first motion data exceeds a threshold in motion data respectively associated with the pieces of adjacent location information, and if yes, notifies the first user to change the first motion data, or if not, establishes association relationships among the first motion data, the business data and the geographical location information.

For example, the data storage device may be in a server. The server may be a single device or a system consisting of multiple devices.

Figure 16:
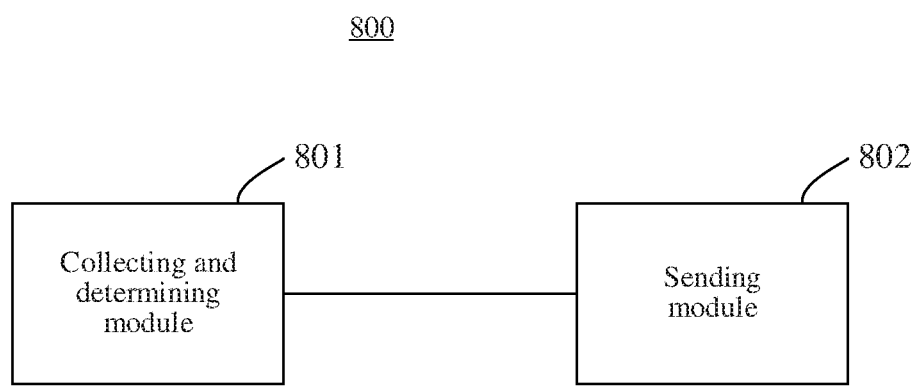
FIG. 16 is a schematic diagram of a data storage device according to some embodiments.

Based on the data storage method shown in FIG. 10, embodiments of the specification further correspondingly provide a schematic diagram of a data storage device, as shown in FIG. 16.

FIG. 16 is a schematic diagram of a data storage device 800 according to some embodiments. Referring to FIG. 16, the data storage device 800 includes: a collecting and determining module 801 for collecting first motion data of a first user and determining business data; and a sending module 802 for sending the first motion data and the business data to a server, so that the server establishes an association relationship between the first motion data and the business data and stores the association relationship.

The sending module 802 collects geographical location information of the device, sends the geographical location information of the device, the first motion data and the business data to the server, so that the server establishes association relationships among the first motion data, the business data and the geographical location information and stores the association relationships.

For example, the data storage device may be in a first terminal. The first terminal is a terminal of a first user who provides business data, and the first terminal may be a mobile phone, a tablet computer, a personal computer, a smart wearable device, or the like.

Figure 17:
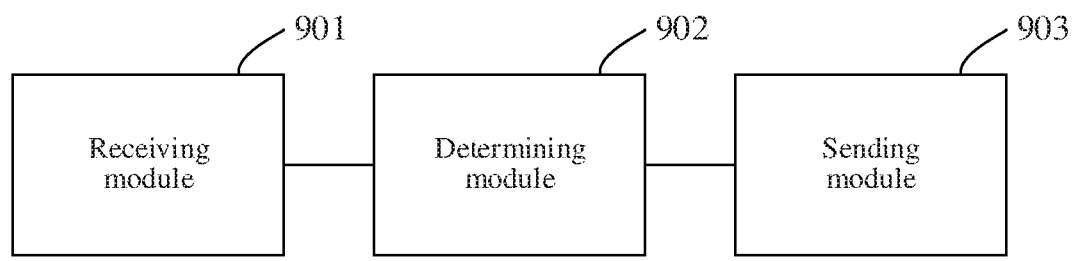
FIG. 17 is a schematic diagram of a data calling device according to some embodiments.

Based on the data calling method shown in FIG. 11, embodiments of the specification further correspondingly provide a schematic diagram of a data calling device, as shown in FIG. 17.

FIG. 17 is a schematic structural diagram of a data calling device 900 according to some embodiments. Referring to FIG. 17, the data calling device 900 includes: a receiving module 901 for receiving second motion data sent by a second user; a determining module 902 for determining first motion data that matches the second motion data; and a sending module 903 for returning, to the second user, business data associated with the determined first motion data.

For example, for every piece of stored first motion data, the determining module 902 performs similarity calculation between the first motion data and the second motion data to determine whether the similarity is higher than a preset threshold, and if yes, determines that the first motion data matches the second motion data, or if not, determines that the first motion data does not match the second motion data.

The determining module 902 determines geographical location information of the second user, determines, from stored geographical location information respectively associated with pieces of first motion data, geographical location information from which the distance to the geographical location information of the second user falls within a specified distance range as adjacent location information, and determines, from first motion data respectively associated with the pieces of adjacent location information, first motion data that matches the second motion data.

When multiple pieces of first motion data that match the second motion data are determined, the sending module 903 sends data IDs of business data associated with the determined pieces of first motion data to the second user, and according to a data ID selected by the second user, returns business data corresponding to the data ID selected by the second user.

For example, the data calling device may be in a server. The server may be a single device or a system consisting of multiple devices.

Figure 18:
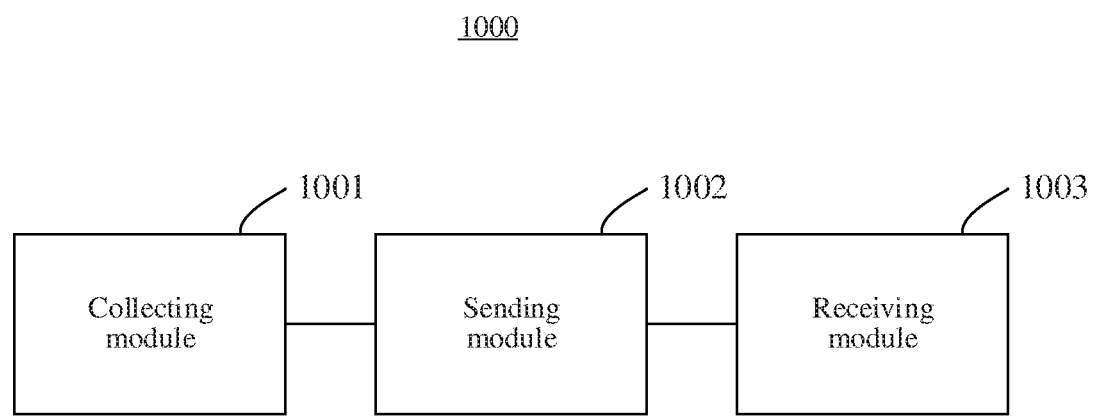
FIG. 18 is a schematic diagram of a data calling device according to some embodiments.

Based on the data calling method shown in FIG. 14, embodiments of the specification further correspondingly provide a schematic diagram of a data calling device, as shown in FIG. 18.

FIG. 18 is a schematic diagram of a data calling device 1000 according to some embodiments. Referring to FIG. 18, the data calling device 1000 includes: a collecting module 1001 for collecting second motion data of a second user; a sending module 1002 for sending the second motion data a server; and a receiving module 1003 for receiving business data returned by the server and associated with first motion data that matches the second motion data.

The determining module 1002 collects geographical location information of the device, sends the geographical location information and the second motion data to the server so that the server determines stored geographical location information, associated with first motion data, from which the distance to the geographical location information of the device falls within specified distance range as adjacent location information, and determines, from first motion data respectively associated with the pieces of adjacent location information, first motion data that matches the second motion data.

When receiving multiple data IDs returned by the server and corresponding to business data associated with the first motion data that matches the second motion data, the receiving module 1003 returns to the server a data ID selected by the second user and receives business data determined by the server according to the data ID selected by the second user.

For example, the data calling device may be in a second terminal. The second terminal is a terminal of a second user who needs to obtain business data, and the second terminal may be a mobile phone, a tablet computer, a personal computer, a smart wearable device, or the like.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

Figure 19:
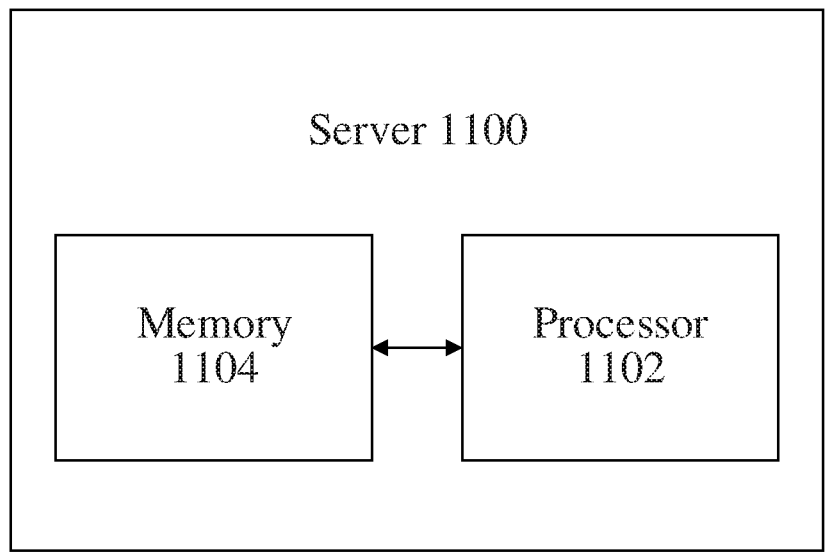
FIG. 19 is a schematic diagram of a server according to some embodiments.

Embodiments of the specification provide a server 1100, as shown in FIG. 19. The server 1100 includes one or more processors 1102 and a memory 1104, wherein the memory 1104 stores a program, and the one or more processors 1102 are configured perform the above described method including e.g., the following steps: receiving first motion data and business data sent by a first user; and establishing an association relationship between the first motion data and the business data and storing the association relationship.

Figure 20:
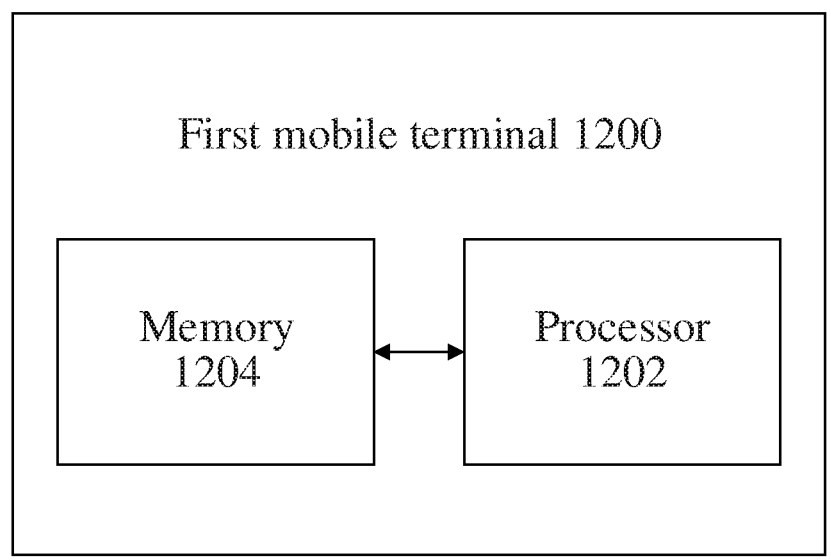
FIG. 20 is a schematic diagram of a first mobile terminal according to some embodiments.

Embodiments of specification provide a first mobile terminal 1200, as shown in FIG. 20. The mobile terminal 1200 includes one or more processors 1202 and a memory 1204, wherein the memory 1204 stores a program, and the one or more processors 1202 are configured to perform the above described method including, e.g., the following steps: collecting first motion data of a first user and determining business data; and sending the first motion data and the business data to a server, so that the server establishes an association relationship between the first motion data and the business data and stores the association relationship.

Figure 21:
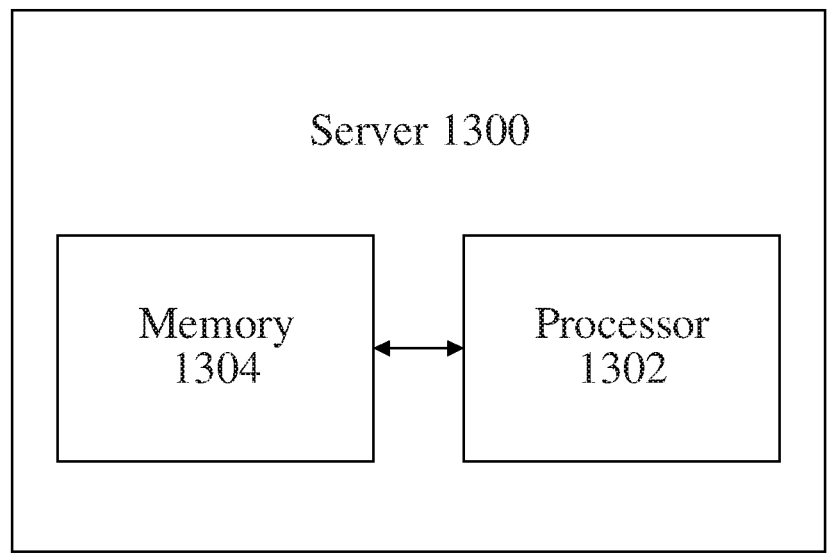
FIG. 21 is a schematic diagram of a server according to some embodiments.

Embodiments of the specification provide a server 1300, as shown in FIG. 21. The server 1300 includes one or more processors 1302 and a memory 1304, wherein the memory 1304 stores a program, and the one or more processors 1302 are configured to perform the above described method including, e.g., the following steps: receiving second motion data sent by a second user; determining first motion data that matches the second motion data; and returning, to the second user, business data associated with the determined first motion data.

Figure 22:
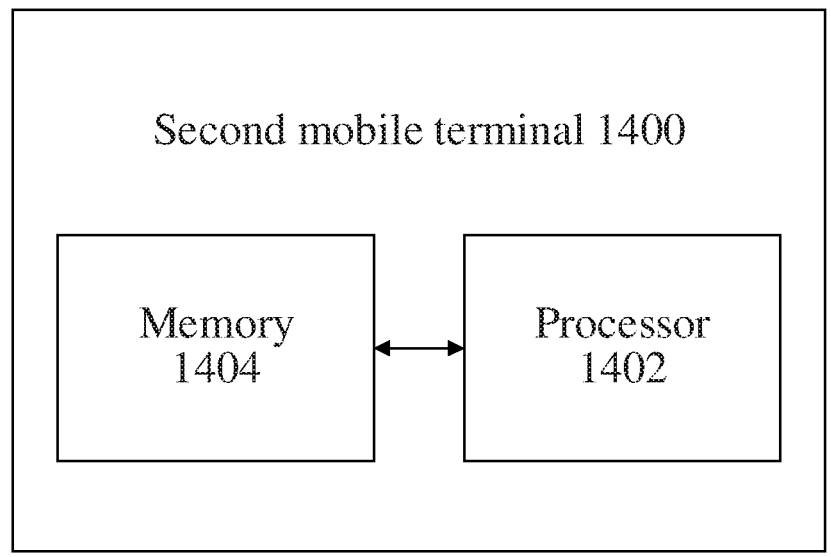
FIG. 22 is a schematic diagram of a second mobile terminal according to some embodiments.

Embodiments of the specification provide a second mobile terminal 1400, as shown in FIG. 22. The mobile terminal 1400 includes one or more processors 1402 and a memory 1404, wherein the memory 1404 stores a program, and the one or more processors 1402 are configured to perform the above described method including, e.g., the following steps: collecting second motion data of a second user; sending the second motion data to a server; and receiving business data returned by the server and associated with first motion data that matches the second motion data.

Each processor described above may include one or more dedicated processing units, application-specific integrated circuits (ASICs), field-programmable gate arrays (FPGAs), or various other types of processors or processing units. Each memory described above may include a permanent memory, a non-permanent memory, a random access memory (RAM) and/or a non-volatile memory (such as a read-only memory (ROM) or a flash memory (flash RAM)), etc.

It should be noted that the various embodiments in the present description are described in a progressive manner, and the same or similar parts between the various embodiments may be referred to each other, and each embodiment focuses on the differences from the other embodiments. In particular, for the mobile terminals and the servers according to some embodiments, since they are basically similar to the method embodiments, they are described in a brief way, and the relevant parts may be referred to the description of the method embodiments.

Each of the above described methods and modules may be implemented as software, or hardware, or a combination of software and hardware. For example, a programmable logic device (PLD) (e.g., a field programmable gate array (FPGA)) is an integrated circuit that its logic function is determined by a user through programming the device. Designers program by themselves to integrate a digital system on a single PLD without requiring a chip manufacturer to design and fabricate a dedicated integrated circuit chip. Moreover, instead of manually making integrated circuit chips, this programming is mostly implemented today using logic compiler software which is similar to a software compiler used in programming development; moreover, original codes before compiling also need to be written by using a specific programming language, which is referred to as a Hardware Description Language (HDL). There many HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language); VHDL (Very-High-Speed Integrated Circuit Hardware Description Language) and Verilog are most commonly used at present. It should also be apparent to those skilled in the art that a hardware flow for implementing a logic process flow may be easily obtained by slightly logically programming the process flow with the several hardware description languages described above and programming the process flow into an integrated circuit.

A controller may be implemented in any suitable manner in the above described devices. The controller can take the form of, for example, a (micro)processor or processor, and a computer readable medium storing a computer readable program code (e.g., software or firmware) executable by the (micro)processor, a logic gate, a switch, an application specific integrated circuit (ASIC), a programmable logic controller, and an embedded microcontroller; examples of the controller include, but are not limited to, the following microcontrollers: ARC 625D, Atmel AT91SAM, Microchip PIC18F26K20 and Silicone Labs C8051F320; and a memory controller can also be implemented as part of the memory's control logic. Those skilled in the art will also appreciate that in addition to implementing the controller by a purely computer readable program code, the controller may achieve the same function in the form of a logic gate, a switch, an ASIC, a programmable logic controller, an embedded microcontroller or the like by logically programming process steps. Such a controller may therefore be considered as a hardware component, and an apparatus included in the controller and configured to implement various functions may also be considered as a structure within the hardware component. Or even an apparatus for implementing various functions may be considered as both a software module for an implementation method and a structure within a hardware component.

The systems, apparatuses, modules or units illustrated in the above embodiments may be implemented by a computer chip or an entity, or by a product having a certain function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device or a combination of any of these devices.

For convenience of description, the above devices are described separately as various modules divided by function. The functions of the various modules may be implemented in one or more pieces of software and/or hardware in the implementation.

Those skilled in the art should appreciate that the above described embodiments may be provided as a method, system, or computer program product. Accordingly, the embodiments may take the form of an entirely hardware embodiment, an entirely software embodiment, or a combination of software and hardware. Moreover, the embodiments may take the form of a computer program product implemented on one or more computer usable storage media (including, but not limited to, disk memories, CD-ROMs and optical memories) comprising computer usable program codes.

The embodiments are described with reference to the flowcharts and/or the block diagrams of a method, a device (system), and a computer program product according to the embodiments of the present invention. It should be understood that each process and/or block in the flowcharts and/or block diagrams, and combinations of the processes and/or blocks in the flowcharts and/or the block diagrams, may be implemented by computer program instructions. These computer program instructions may be provided to a processor of a general-purpose computer, a special-purpose computer, an embedded processor, or other programmable data processing devices to produce a machine such that instructions are executed by the processor of the computer or other programmable data processing devices to generate an apparatus for implementing the functions specified in one or more processes in the flowcharts and/or one or more blocks in the block diagrams.

These computer program instructions may also be stored in a computer readable memory that may direct a computer or other programmable data processing devices to function in a particular manner such that the instructions stored in the computer readable memory produce an article of manufacture including an instruction means which implements functions specified in one or more processes in the flowcharts and/or one or more blocks in the block diagrams.

These computer program instructions may also be loaded onto a computer or other programmable data processing devices to cause a series of operating steps to be performed on the computer or other programmable devices to produce computer-implemented processing, and the instructions executed on a computer or other programmable devices provide steps for implementing the functions specified in one or more processes in the flowcharts and/or one or more blocks in the block diagrams.

The computer-readable storage media include both permanent and non-persistent removable and non-removable media and may store information by any method or technology. The information may be a computer readable instruction, a data structure, a module of a program or other data. Examples of the computer-readable storage media include, but are not limited to, a phase change memory (PRAM), a static random access memory (SRAM), a dynamic random access memory (DRAM), other types of random access memory (RAM), a read only memory (ROM), an electrically erasable programmable read-only memory (EEPROM), a flash memory or other memory technologies, a read-only optical disk read-only memory (CD-ROM), a digital versatile disc (DVD) or other optical storages, a magnetic tape cassette, a magnetic disk storage or other magnetic storage devices or any other non-transmission medium for storing information that may be accessed by computing devices. As defined herein, the computer readable media do not include transitory media, such as modulated data signals and carriers.

It is also to be understood that the term "include," "comprise" or any of other variants thereof is intended to cover non-exclusive inclusions such that a process, method, article, or device that includes a series of elements not only includes those elements but also includes other elements that are not listed explicitly, or also includes inherent elements of this process, method, article, or device. In the absence of more restrictions, an element defined by the sentence "including a/an . . . " does not preclude other identical elements existing in the process, method, article or device that includes the element.

Those skilled in the art should understand that the above described embodiments may be provided as a method, a system, or a computer program product. Accordingly, this application may take the form of an entirely hardware embodiment, an entirely software embodiment, or an embodiment combining software and hardware. Moreover, the embodiments may take the form of a computer program product implemented on one or more computer usable storage media (including, but not limited to, disk memories, CD-ROMs and optical memories) comprising computer usable program codes.

The embodiments may be described in the general context of computer-executable instructions executed by a computer, such as program modules. Generally, the program modules include routines, programs, objects, components, data structures, and the like that perform particular tasks or implement particular abstract data types. The embodiments may also be practiced m distributed computing environments where tasks are performed by remote processing devices that are connected through a communication network. In a distributed computing environment, program modules may be in both local and remote computer storage media including storage devices.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A data storage method for a server, comprising:
receiving first motion data and business data sent by a first user, the first user being a user providing the business data; and
establishing an association relationship between the first motion data and the business data and storing the association relationship, wherein the first motion data and the business data both include an account ID of the first user and when it is determined, according to the account ID included in the first motion data and the business data, that the first motion data and the business data have the association relationship, the association relationship between the first motion data and the business data is established,
wherein the establishing the association relationship between the first motion data and the business data further comprises:
determining geographical location information of the first user providing the business data;
determining, from geographical location information stored on the server and associated with business data, one or more pieces of adjacent location information, a distance between each of the one or more pieces of adjacent location information and the geographical location information of the first user being within a specified distance range;

determining, in motion data stored on the server and associated with the one or more pieces of adjacent location information, whether there is motion data with a similarity to the first motion data exceeding a threshold;

in response to a determination that there is the motion data, notifying the first user to change the first motion data; and in response to a determination that there is not the motion data, establishing association relationships among the first motion data, the business data, and the geographical location information of the first user.

2. The method of claim 1, wherein the receiving the first motion data sent by the first user comprises:

receiving motion description information sent by the first user; and determining, from pre-stored pieces of motion data, motion data corresponding to the motion description information as the received first motion data.

3. The method of claim 1, wherein the business data includes text, a picture, or a uniform resource locator URL.

4. A data storage method for a first terminal, comprising:

collecting, by the first terminal, first motion data and business data of a first user, the first user being a user providing the business data; and sending the first motion data and the business data to a server, so that the server establishes an association relationship between the first motion data and the business data and stores the association relationship, wherein the first motion data and the business data both include an account ID of the first user and when it is determined, according to the account ID included in the first motion data and the business data, that the first motion data and the business data have the association relationship, the server establishes the association relationship between the first motion data and the business data, and stores the first motion data, the business data, and the established association relationship, wherein the sending the first motion data and the business data to the server comprises:

collecting geographical location information of the first user providing the business data; and sending the geographical location information of the first user, the first motion data, and the business data to the server, wherein the server establishing the association relationship between the first motion data and the business data further comprises:

determining the geographical location information of the first user providing the business data;

determining, from geographical location information stored on the server and associated with business data, one or more pieces of adjacent location information, a distance between each of the one or more pieces of adjacent location information and the geographical location information of the first user being within a specified distance range;

determining, in motion data stored on the server and associated with the one or more pieces of adjacent location information, whether there is motion data with a similarity to the first motion data exceeding a threshold;

in response to a determination that there is the motion data, notifying the first user to change the first motion data; and in response to a determination that there is not the motion data, establishing association relationships among the first motion data, the business data, and the geographical location information of the first user.

5. A data calling method for a server, comprising:

receiving second motion data sent by a second user;

determining first motion data that matches the second motion data; and returning, to the second user, business data associated with the determined first motion data, the business data being sent to the server by a first user providing the business data, wherein the first motion data and the business data both include an account ID of the first user and when it is determined, according to the account ID included in the first motion data and the business data, that the first motion data and the business data have the association relationship, the association relationship between the first motion data and the business data is established, and the first motion data, the business data, and the established association relationship are stored, wherein the determining the first motion data that matches the second motion data comprises:

determining geographical location information of the second user;

determining, from geographical location information stored on the server and associated with motion data, one or more pieces of adjacent location information, a distance between each of the one or more pieces of adjacent location information and the geographical location information of the second user being within a specified distance range; and determining the first motion data that matches the second motion data from the motion data associated with the one or more pieces of adjacent location information, wherein the server establishes the association relationship between the first motion data and the business data, comprising:

determining geographical location information of the first user providing the business data;

determining, from geographical location information stored on the server and associated with business data, one or more pieces of adjacent location information, a distance between each of the one or more pieces of adjacent location information and the geographical location information of the first user being within the specified distance range;

determining, in motion data stored on the server and associated with the one or more pieces of adjacent location information, whether there is motion data with a similarity to the first motion data exceeding a threshold;

in response to a determination that there is the motion data, notifying the first user to change the first motion data; and in response to a determination that there is not the motion data, establishing association relationships among the first motion data, the business data, and the geographical location information of the first user.

6. The method of claim 5, wherein the determining the first motion data that matches the second motion data comprises:

for every piece of stored first motion data, performing a similarity calculation between the first motion data and the second motion data to determine whether a similarity is higher than a preset threshold;

if it is determined that the similarity is higher than the preset threshold, determining that the first motion data matches the second motion data; and if it is determined that the similarity is not higher than the preset threshold, determining that the first motion data does not match the second motion data.

7. The method of claim 5, wherein the returning, to the second user, the business data associated with the matched first motion data comprises:

when multiple pieces of first motion data that match the second motion data are determined, sending, to the second user, data IDs of business data associated with the determined pieces of first motion data; and according to a data ID selected by the second user, returning business data associated with the data ID selected by the second user.

8. A data calling method for a second terminal, comprising:

collecting, by the second terminal, second motion data of a second user;

sending the second motion data to a server; and receiving business data returned by the server and associated with first motion data that matches the second motion data, the business data being sent to the server by a first terminal of a first user providing the business data, wherein the first motion data and the business data both include an account ID of the first user and when it is determined, according to the account ID included in the first motion data and the business data, that the first motion data and the business data have the association relationship, the server establishes the association relationship between the first motion data and the business data, and stores the first motion data, the business data, and the established association relationship, wherein the sending the second motion data to the server comprises:

collecting geographical location information of the second user; and sending the geographical location information and the second motion data to the server so that the server determines one or more pieces of adjacent location information, a distance between each of the one or more pieces of adjacent location information and the geographical location information of the second user being within a specified distance range, and determines, from motion data stored on the server and associated with the one or more pieces of adjacent location information, the first motion data that matches the second motion data, wherein the server establishing the association relationship between the first motion data and the business data further comprises:

determining geographical location information of the first user providing the business data;

determining, from geographical location information stored on the server and associated with business data, one or more pieces of adjacent location information, a distance between each of the one or more pieces of adjacent location information and the geographical location information of the first user being within the specified distance range;

determining, in motion data stored on the server and associated with the one or more pieces of adjacent location information, whether there is motion data with a similarity to the first motion data exceeding a threshold;

in response to a determination that there is the motion data, notifying the first user to change the first motion data; and in response to a determination that there is not the motion data, establishing association relationships among the first motion data, the business data, and the geographical location information of the first user.

9. The method of claim 8, wherein the receiving the business data returned by the server and associated with the first motion data that matches the second motion data comprises:

when receiving multiple data IDs returned by the server and corresponding to business data associated with the first motion data that matches the second motion data, returning, to the server, a data ID selected by the second user; and receiving business data determined by the server according to the data ID selected by the second user.

* * * * *